(12) United States Patent
Yamauchi et al.

(10) Patent No.: US 10,044,047 B2
(45) Date of Patent: Aug. 7, 2018

(54) ELECTRODE-MEMBRANE-FRAME ASSEMBLY, METHOD FOR PRODUCING THE SAME, AND FUEL CELL

(75) Inventors: Masaki Yamauchi, Osaka (JP); Yoichiro Tsuji, Osaka (JP); Atusi Murata, Shiga (JP); Takashi Morimoto, Osaka (JP); Toshihiro Matsumoto, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1120 days.

(21) Appl. No.: 13/203,733

(22) PCT Filed: Dec. 27, 2010

(86) PCT No.: PCT/JP2010/007548
§ 371 (c)(1),
(2), (4) Date: Aug. 29, 2011

(87) PCT Pub. No.: WO2011/083548
PCT Pub. Date: Jul. 14, 2011

(65) Prior Publication Data
US 2011/0311898 A1    Dec. 22, 2011

(30) Foreign Application Priority Data

Jan. 5, 2010 (JP) ................................. 2010-000552

(51) Int. Cl.
*H01M 8/10* (2016.01)
*H01M 8/00* (2016.01)
(Continued)

(52) U.S. Cl.
CPC ......... *H01M 8/006* (2013.01); *H01M 8/0263* (2013.01); *H01M 8/0267* (2013.01);
(Continued)

(58) Field of Classification Search
CPC .. H01M 8/006; H01M 8/2483; H01M 8/0267; H01M 8/0263; H01M 8/242;
(Continued)

(56) References Cited

U.S. PATENT DOCUMENTS

2002/0051902 A1   5/2002  Suenaga et al.
2003/0091885 A1*  5/2003  Kobayashi .......... H01M 8/0273
                                                         29/623.2
(Continued)

FOREIGN PATENT DOCUMENTS

CN       101330151      12/2008
JP       2002-124276     4/2002
(Continued)

OTHER PUBLICATIONS

Chinese Office Action dated Apr. 3, 2014 (with English translation) in a counterpart Chinese application.
(Continued)

*Primary Examiner* — Ula Corinna Ruddock
*Assistant Examiner* — Matthew W Van Oudenaren
(74) *Attorney, Agent, or Firm* — Wenderoth, Lind & Ponack, L.L.P.

(57) ABSTRACT

A method for producing an electrode-membrane-frame assembly according to the present invention includes arranging a previously molded first molded body on a circumferential region of first catalyst layer close to first gas diffusion layer, arranging a previously molded second molded body on a circumferential region of second catalyst layer close to second gas diffusion layer, and forming a third molded body by injection molding so as to integrally connect the first molded body and the second molded body and not to be directly in contact with an inner side region of second main surface of a polymer electrolyte membrane positioned on an inner side of an outer edge part of the second molded body
(Continued)

when viewed from a thickness direction of the polymer electrolyte membrane, whereby a frame having the first, second, and the third molded body is formed. Thus, the polymer electrolyte membrane can be prevented from deteriorating.

13 Claims, 13 Drawing Sheets

(51) Int. Cl.
    *H01M 8/2483* (2016.01)
    *H01M 8/242* (2016.01)
    *H01M 8/0263* (2016.01)
    *H01M 8/0267* (2016.01)
    *H01M 8/0284* (2016.01)
    *H01M 8/0286* (2016.01)
    *H01M 8/0273* (2016.01)
    *H01M 8/1018* (2016.01)

(52) U.S. Cl.
    CPC ....... *H01M 8/0273* (2013.01); *H01M 8/0284* (2013.01); *H01M 8/0286* (2013.01); *H01M 8/242* (2013.01); *H01M 8/2483* (2016.02); *H01M 2008/1095* (2013.01)

(58) Field of Classification Search
    CPC ............. H01M 8/0273; H01M 8/0286; H01M 8/0284; H01M 2008/1095
    See application file for complete search history.

(56) References Cited

U.S. PATENT DOCUMENTS

| | | | | |
|---|---|---|---|---|
| 2004/0096730 | A1* | 5/2004 | Kuroki et al. | 429/44 |
| 2006/0046124 | A1* | 3/2006 | Lai | H01M 8/023 429/463 |
| 2006/0073373 | A1* | 4/2006 | Andrin | H01M 8/0247 429/483 |
| 2006/0269819 | A1* | 11/2006 | Artibise | H01M 8/0276 429/483 |
| 2007/0264557 | A1 | 11/2007 | Kobayashi et al. | |
| 2008/0230936 | A1* | 9/2008 | Takada | H01M 8/0273 264/40.1 |
| 2008/0305384 | A1 | 12/2008 | Kawashima et al. | |
| 2009/0029230 | A1* | 1/2009 | Shirahama | 429/35 |
| 2009/0202884 | A1* | 8/2009 | Kusakabe | B29C 45/14336 429/494 |
| 2009/0286123 | A1 | 11/2009 | Morimoto et al. | |
| 2010/0098989 | A1 | 4/2010 | Morimoto et al. | |
| 2010/0143819 | A1 | 6/2010 | Morimoto et al. | |
| 2010/0183941 | A1* | 7/2010 | Kurita | H01M 4/8605 429/480 |
| 2010/0248087 | A1 | 9/2010 | Tsuji et al. | |
| 2011/0091792 | A1 | 4/2011 | Sugimoto et al. | |

FOREIGN PATENT DOCUMENTS

| | | | | |
|---|---|---|---|---|
| JP | 2005-268077 | 9/2005 | | |
| JP | WO 2008129840 A1 * | 10/2008 | ....... | B29C 45/14336 |
| JP | 2009-21217 | 1/2009 | | |
| JP | 2009-047908 | 4/2009 | | |
| WO | 2008/129839 | 10/2008 | | |
| WO | WO 2008153147 A1 * | 12/2008 | .......... | H01M 4/8605 |
| WO | 2009/047908 | 4/2009 | | |
| WO | 2009/072291 | 6/2009 | | |
| WO | 2009/145090 | 12/2009 | | |

OTHER PUBLICATIONS

English translation of International Preliminary Report on Patentability and Written Opinion of the International Searching Authority, dated Aug. 14, 2012 in PCT/JP2010/007548.
Extended European Search Report dated Aug. 10, 2016 in European Application No. 10842068.8.
European Office Action dated May 29, 2017 in European Patent Application No. 10 842 068.8.
International Search Report dated Apr. 5, 2011 in International (PCT) Application No. PCT/JP2010/007548.

\* cited by examiner

ELECTRODE-MEMBRANE-FRAME ASSEMBLY, METHOD FOR PRODUCING THE SAME, AND FUEL CELL

TECHNICAL FIELD

The present invention relates to a fuel cell used as a drive source for a moving object such as a car, a dispersed power generation system, a household cogeneration system, or the like, and more particularly, to an electrode-membrane-frame assembly provided in the fuel cell, and a method for producing the same.

BACKGROUND ART

A fuel cell (such as polymer electrolyte type fuel cell) allows a fuel gas containing hydrogen and an oxidant gas containing oxygen such as air to electrochemically react with each other, such that electric power and heat are produced at the same time.

In general, a fuel cell is configured by stacking a plurality of cells, and pressurizing and fastening them with a bolt. One cell is configured such that a membrane-electrode assembly (hereinafter, referred to as the MEA) is sandwiched by one paired plate-like conductive separators. A circumferential region of the MEA is held by a frame. In addition, here, the MEA having the frame is referred to as the electrode-membrane-frame assembly.

The electrode-membrane-frame assembly is formed as follows in general (refer to International Publication No. WO2009/072291, for example). FIGS. 26A to 26C are schematic explanatory views showing production steps of a conventional electrode-membrane-frame assembly in which a connection part between a MEA and a frame is overdrawn.

First, as shown in FIG. 26A, a molten thermoplastic resin is poured into a die T100A to form a primary molded body 102A serving as one part of a frame 102 by injection molding.

Then, as shown in FIG. 26B, a MEA 101 is arranged on the primary molded body 102A.

Here, the MEA 101 is configured by a polymer electrolyte membrane 111, and one paired electrode layers 112 arranged on both surfaces of the polymer electrolyte membrane ill. In general, each electrode layer 112 is configured by a catalyst layer 113 containing, as its principal component, carbon powder bearing a metal catalyst, and a porous gas diffusion layer 114 having conductivity and arranged on the catalyst layer 113.

Then, as shown in FIG. 26C, a molten thermoplastic resin is poured into a die T100B to form a secondary molded body 102B serving as the other part of the frame 102 by injection molding. Thus, the primary molded body 102A and the secondary molded body 102B are integrally connected to form the frame 102, whereby the electrode-membrane-frame assembly is produced.

PRIOR ART DOCUMENT

Patent Document

Patent document 1: International Publication No. WO2009/072291

SUMMARY OF THE INVENTION

Subject to be Solved by the Invention

According to the conventional production method, the secondary molded body 102B of the frame 102 is formed by injection molding. At the time of injection molding, it is necessary to melt the thermoplastic resin, so that a temperature of the thermoplastic resin when poured into the die is as high as 200° C. or more. When the high-temperature thermoplastic resin directly comes in contact with the polymer electrolyte membrane 111 in forming the secondary molded body 102E by injection molding, the polymer electrolyte membrane 111 could deteriorate (a membrane thickness is reduced, or a strength is lowered) due to the heat of the thermoplastic resin. In addition, the catalyst layer 113 is normally configured by a porous member containing, as its main component, carbon powder bearing a metal catalyst. When the high-temperature thermoplastic resin is directly in contact with the catalyst layer 113, the high-temperature thermoplastic resin reaches the polymer electrolyte membrane 111 through the catalyst layer 113, and the polymer electrolyte membrane 111 could deteriorate (a membrane thickness is reduced or a strength is lowered) due to the heat of the thermoplastic resin.

In addition, an injection pressure of the thermoplastic resin into the die needs to be ten times as high as a fastening pressure of the cell to ensure sufficient molding precision, in general. When the high-pressure thermoplastic resin is directly in contact with the polymer electrolyte membrane 111 in forming the secondary molded body 102B by injection molding, the polymer electrolyte membrane 111 could deteriorate due to the pressure of the thermoplastic resin. In addition, when the high-pressure thermoplastic resin is directly in contact with the catalyst layer 113, the high-pressure thermoplastic resin reaches the polymer electrolyte membrane 111 through the catalyst layer 113, and the polymer electrolyte membrane 111 could deteriorate due to the pressure of the thermoplastic resin.

When the polymer electrolyte membrane 111 deteriorates, power generation performance of the fuel cell is lowered. Especially, since the secondary molded body 102B is close to a power generation region, an issue that the power generation performance is lowered due to the deterioration of the polymer electrolyte membrane 111 in the vicinity of the power generation region becomes more serious. Here, the power generation region is a part in which one paired gas diffusion layers 114 and 114 overlap with each other when viewed from a thickness direction of the polymer electrolyte membrane 111.

Therefore, it is an object of the present invention to improve the above issue, and to provide an electrode-membrane-frame assembly capable of preventing a polymer electrolyte membrane from deteriorating, a method for producing the same, and a fuel cell having the electrode-membrane-frame assembly.

Means for Solving the Subject

In order to attain the object stated above, the present invention is configured as follows.

According to a first aspect of the present invention is provided a method for producing an electrode-membrane-frame assembly in which a frame is formed on a circumferential region of a membrane-electrode assembly, the membrane-electrode assembly having a first catalyst layer arranged on a first main surface of a polymer electrolyte membrane, a first gas diffusion layer arranged on a main surface of the first catalyst layer, a second catalyst layer arranged on a second main surface of the electrolyte membrane, and a second gas diffusion layer arranged on a main surface of the second catalyst layer, the method comprising the steps of:

arranging a first molded body on a side of the first main surface of the electrolyte membrane so that a circumferential region of the electrolyte membrane overlaps with at least an inner edge part of the first molded body, the first molded body being previously molded and having a frame shape, when viewed from a thickness direction of the electrolyte membrane, arranging a second molded body on a side of the second main surface of the electrolyte membrane so that the circumferential region of the electrolyte membrane overlaps with at least an inner edge part of the second molded body, the second molded body being previously molded and having a frame shape, when viewed from the thickness direction of the electrolyte membrane, and forming the frame including the first molded body, the second molded body, and a third molded body by forming the third molded body between the first molded body and the second molded body by injection molding so as to integrally connect the first molded body and the second molded body and not to be directly in contact with an inner side region of the second main surface of the electrolyte membrane positioned on an inner side of an outer edge part of the second molded body when viewed from the thickness direction of the electrolyte membrane after arranging the first molded body and arranging the second molded body.

According to a second aspect of the present invention is provided the method for producing an electrode-membrane-frame assembly according to the first aspect, wherein in the step of arranging the second molded body, the second molded body is arranged on a circumferential region of the second catalyst layer so that a main surface of the circumferential region of the second catalyst layer is partially exposed, and in the step of forming the frame, the third molded body is formed by injection molding so that the third molded body partially overlaps with a part of the exposed circumferential region of the second catalyst layer when viewed from the thickness direction of the electrolyte membrane.

According to a third aspect of the present invention is provided the method for producing an electrode-membrane-frame assembly according to the second aspect, wherein in the step of forming the frame, the third molded body is formed by injection molding so that a resin material constituting the third molded body is partially mixed with and present in the part of the exposed circumferential region of the second catalyst layer.

According to a fourth aspect of the present invention is provided the method for producing an electrode-membrane-frame assembly according to the second aspect, wherein in the step of arranging the first molded body, the first molded body is arranged on a circumferential region of the first catalyst layer so that a main surface of the circumferential region of the first catalyst layer is partially exposed, and in the step of forming the frame, the third molded body is formed by injection molding so that the third molded body partially overlaps with a part of the exposed circumferential region of the first catalyst layer when viewed from the thickness direction of the electrolyte membrane.

According to a fifth aspect of the present invention is provided the method for producing an electrode-membrane-frame assembly according to the fourth aspect, wherein in the step of forming the frame, the third molded body is formed by injection molding so that a resin material constituting the third molded body is partially mixed with and present in the part of the exposed circumferential region of the first catalyst layer.

According to a sixth aspect of the present invention is provided the method for producing an electrode-membrane-frame assembly according to any one of the first to fifth aspects, wherein the membrane-electrode assembly is provided so that at least one of the circumferential region of the first catalyst layer and the circumferential region of the second catalyst layer is arranged on an inner side of the circumferential region of the electrolyte membrane when viewed from the thickness direction of the electrolyte membrane.

According to a seventh aspect of the present invention is provided the method for producing an electrode-membrane-frame assembly according to any one of the first to fifth aspects, wherein the membrane-electrode assembly is provided so that the circumferential region of the first catalyst layer is arranged on an outer side of a circumferential region of the first gas diffusion layer, and the circumferential region of the second catalyst layer is arranged on an outer side of a circumferential region of the second gas diffusion layer when viewed from the thickness direction of the electrolyte membrane, in the step of arranging the first molded body, the first molded body is arranged so that the circumferential region of the first catalyst layer overlaps with at least an inner edge part of the first molded body when viewed from the thickness direction of the electrolyte membrane, and in the step of arranging the second molded body, the second molded body is arranged so that the circumferential region of the second catalyst layer overlaps with at least an inner edge part of the second molded body when viewed from the thickness direction of the electrolyte membrane.

According to an eighth aspect of the present invention is provided the method for producing an electrode-membrane-frame assembly according to any one of the first to seventh aspects, wherein the method comprises steps of:

arranging the first gas diffusion layer on the main surface of the first catalyst layer; and arranging the second gas diffusion layer on the main surface of the second catalyst layer, before arranging the first molded body, arranging the second molded body, and forming the frame, and in the step of arranging the first molded body, the first molded body is arranged on an outer side of the circumferential region of the first gas diffusion layer when viewed from the thickness direction of the electrolyte membrane, in the step of arranging the second molded body, the second molded body is arranged on an outer side of the circumferential region of the second gas diffusion layer when viewed from the thickness direction of the electrolyte membrane.

According to a ninth aspect of the present invention is provided the method for producing an electrode-membrane-frame assembly according to any one of the first to seventh aspects, wherein the method comprises steps of:

arranging the first gas diffusion layer on the main surface of the first catalyst layer; and arranging the second gas diffusion layer on the main surface of the second catalyst layer, after arranging the first molded body, arranging the second molded body, and forming the frame, in the step of arranging the first molded body, the first gas diffusion layer is arranged on an inner side of the inner edge part of the first molded body when viewed from the thickness direction of the electrolyte membrane, and in the step of arranging the second molded body, the second gas diffusion layer is arranged on an inner side of the inner edge part of the second molded body when viewed from the thickness direction of the electrolyte membrane.

According to a 10th aspect of the present invention is provided the method for producing an electrode-membrane-frame assembly according to the eighth or ninth aspect, wherein in the step of forming the frame, the third molded body is formed by injection molding so that the resin material constituting the third molded body is partially mixed with and present in the circumferential region of the second gas diffusion layer.

According to an 11th aspect of the present invention is provided the method for producing an electrode-membrane-frame assembly according to any one of the eighth to 10th aspects, further comprising steps of:

arranging the first molded body across a gap from the first gas diffusion layer;

arranging the second molded body across a gap from the second gas diffusion layer; and arranging an elastic body in the gap after forming the frame.

According to a 12th aspect of the present invention is provided the method for producing an electrode-membrane-frame assembly according to the first aspect, wherein the first molded body and the second molded body are integrally molded so that the first molded body and the second molded body are partially connected before connected by the third molded body.

According to a 13th aspect of the present invention is provided an electrode-membrane-frame assembly in which a frame is formed on a circumferential region of a membrane-electrode assembly, the membrane-electrode having a first catalyst layer arranged on a first main surface of a polymer electrolyte membrane, a first gas diffusion layer arranged on a main surface of the first catalyst layer, a second catalyst layer arranged on a second main surface of the electrolyte membrane, and a second gas diffusion layer arranged on a main surface of the second catalyst layer, wherein the frame has a first molded body, a second molded body, and a third molded body, the first molded body has a frame shape and is arranged on a side of the first main surface of the electrolyte membrane so that a circumferential region of the electrolyte membrane overlaps with at least an inner edge part of the first molded body when viewed from a thickness direction of the electrolyte membrane, the second molded body has a frame shape and is arranged on a side of the second main surface of the electrolyte membrane so that the circumferential region of the electrolyte membrane overlaps with at least an inner edge part of the second molded body when viewed from the thickness direction of the electrolyte membrane, and the third molded body is arranged between the first molded body and second molded body to integrally connect the first molded body and the second molded body.

According to a 14th aspect of the present invention is provided the electrode-membrane-frame assembly according to the 13th aspect, wherein the frame is arranged so that at least one of parts of circumferential regions of the first catalyst layer and the second catalyst layer overlaps with a part of the third molded body when viewed from the thickness direction of the electrolyte membrane.

According to a 15th aspect of the present invention is provided the electrode-membrane-frame assembly according to the 13th or 14th aspect, wherein a resin material constituting the third molded body is partially mixed with and present in at least one of a part of a main surface of the circumferential region of the first catalyst layer and a part of a main surface of the circumferential region of the second catalyst layer, a material constituting the first molded body is not mixed with and present in the main surface of the circumferential region of the first catalyst layer, and a material constituting the second molded body is not mixed with and present in the main surface of the circumferential region of the second catalyst layer.

According to a 16th aspect of the present invention is provided the electrode-membrane-frame assembly according to any one of the 13th to 15th aspects, wherein at least one of the circumferential region of the first catalyst layer and the circumferential region of the second catalyst layer is arranged in an inner side of the circumferential region of the electrolyte membrane when viewed from the thickness direction of the electrolyte membrane.

According to a 17th aspect of the present invention is provided the electrode-membrane-frame assembly according to any one of the 13th to 16th aspects, wherein the circumferential region of the first catalyst layer is arranged on an outer side of a circumferential region of the first gas diffusion layer, and the circumferential region of the second catalyst layer is arranged on an outer side of a circumferential region of the second gas diffusion layer when viewed from the thickness direction of the electrolyte membrane, and the frame is provided such that the first molded body is arranged so that the circumferential region of the first catalyst layer overlaps with at least an inner edge part of the first molded body when viewed from the thickness direction of the electrolyte membrane, and the second molded body is arranged so that the circumferential region of the second catalyst layer overlaps with at least an inner edge part of the second molded body when viewed from the thickness direction of the electrolyte membrane.

According to an 18th aspect of the present invention is provided the electrode-membrane-frame assembly according to any one of the 13th to 17th aspects, wherein the first molded body is arranged on an outer side of the circumferential region of the first gas diffusion layer when viewed from the thickness direction of the electrolyte membrane, and the second molded body is arranged on an outer side of the circumferential region of the second gas diffusion layer when viewed from the thickness direction of the electrolyte membrane.

According to a 19th aspect of the present invention is provided the electrode-membrane-frame assembly according to the 18th aspect, wherein at least one of the first and second molded bodies is arranged across a gap from at least one of the first and second gas diffusion layers, and an elastic body is arranged to cover the gap and at least one of the first and second molded bodies adjacent to the gap.

According to a 20th aspect of the present invention is provided the electrode-membrane-frame assembly according to the 19th aspect, wherein a resin material constituting the elastic body is partially mixed with and present in at least one circumferential region of the first and second gas diffusion layers adjacent to the gap.

According to a 21st aspect of the present invention is provided the electrode-membrane-frame assembly according to the 13th aspect, wherein the first molded body and the second molded body are constituted by resin materials having different degrees of hardness.

According to a 22nd aspect of the present invention is provided the electrode-membrane-frame assembly according to the 21st aspect, wherein one of the first and second molded bodies is constituted by a thermoplastic resin, and an other of the first and second molded bodies is constituted by a thermoplastic elastomer.

According to 23rd aspect of the present invention is provided the electrode-membrane-frame assembly according to the 13th aspect, wherein at least one of the first and second molded bodies is configured by a multilayer structure including a thermoplastic resin layer and a thermoplastic elastomer layer.

According to a 24th aspect of the present invention is provided the electrode-membrane-frame assembly according to the 23rd aspect, wherein the thermoplastic elastomer layer is configured so as to be in contact with the circumferential region of the first or the second catalyst layer.

According to a 25th aspect of the present invention is provided a fuel cell comprising the electrode-membrane-frame assembly according to any one of the 13th to 24th aspects.

Effects of the Invention

According to the method for producing an electrode-membrane-frame assembly of the present invention, the previously molded first molded body is arranged on the side of the first main surface of the circumferential region of the electrolyte membrane, and the previously molded second molded body is arranged on the side of the second main surface of the circumferential region of the electrolyte membrane. In addition, the third molded body is provided so as not to be directly in contact with the inner side region of the main surface of the electrolyte membrane positioned on the inner side of the outer edge part of the second molded body when viewed from the thickness direction of the electrolyte membrane. That is, the high-temperature and high-pressure thermoplastic resin is provided so as not to be directly in contact with the catalyst layer in the vicinity of the power generation region. Thus, the polymer electrolyte membrane can be prevented from deteriorating, and the power generation performance is prevented from being lowered.

In addition, according to the method for producing an electrode-membrane-frame assembly of the present invention, since the first molded body and the second molded body are integrally connected by the third molded body formed by injection molding, adhesion between the frame and the MEA can be enhanced.

In addition, according to the electrode-membrane-frame assembly of the present invention, since the frame is configured by the three molded bodies, and the first molded body and the second molded body are integrally connected by the third molded body, the first molded body and the second molded body are not necessarily formed by injection molding. Thus, the polymer electrolyte membrane can be prevented from deteriorating.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Before continuing the description of the present invention, the same reference is allotted to the same component in the accompanying drawings.

Hereinafter, a description will be given of embodiments of the present invention with reference to the drawings.

First Embodiment

Figure 1:
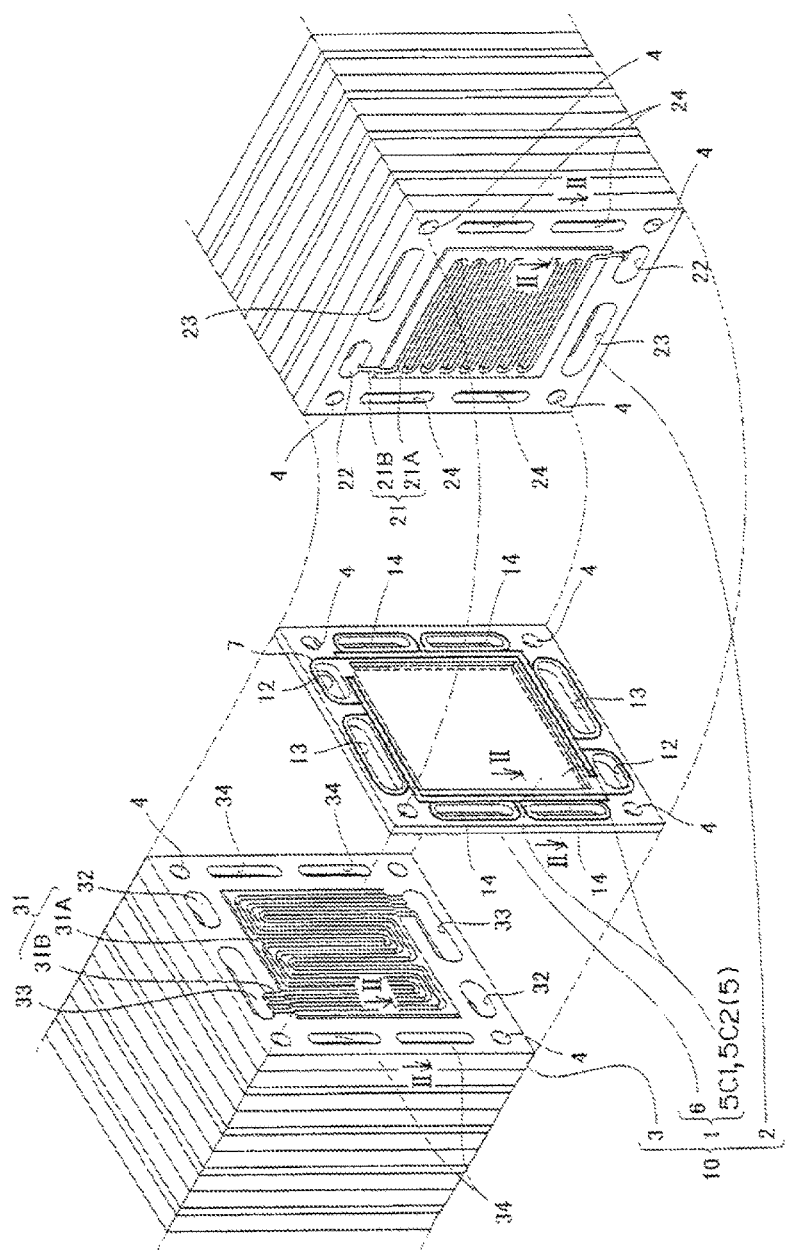
FIG. 1 is a perspective view schematically showing a partially exploded structure of a fuel cell having an electrode-membrane-frame assembly according to a first embodiment of the present invention.
Figure 2:
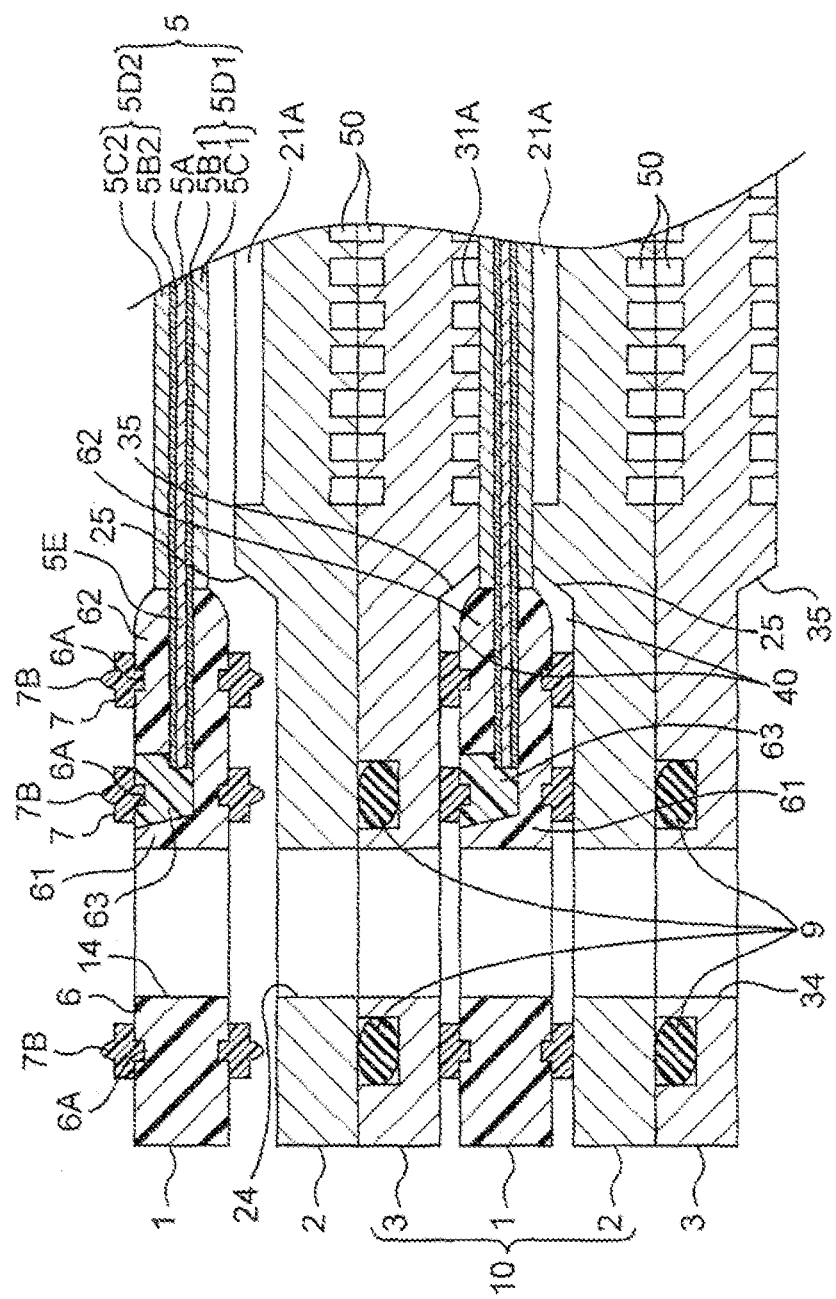
FIG. 2 is a view showing a partially exploded stacked cross-section of a cell taken along a line II-II in FIG. 1.
Figure 3:
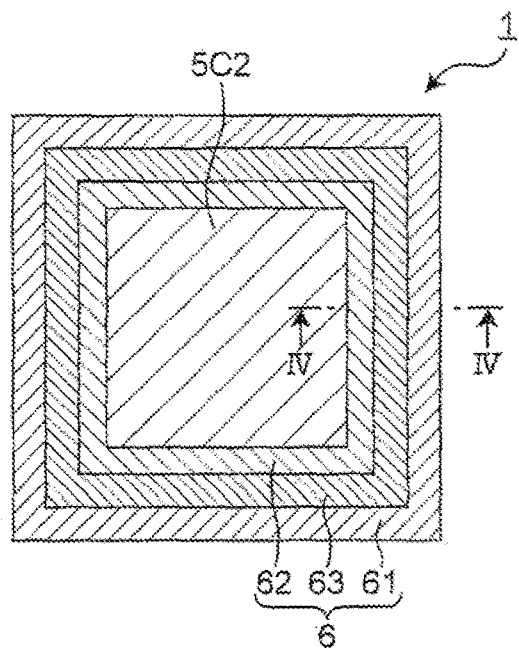
FIG. 3 is a plan view schematically showing a configuration of the electrode-membrane-frame assembly in FIG. 1.
Figure 4:
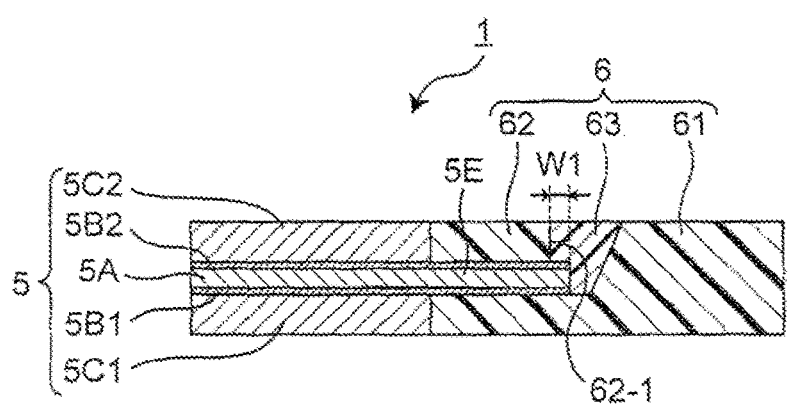
FIG. 4 is a cross-sectional view taken along a line IV-IV in FIG. 3.
Figure 5:
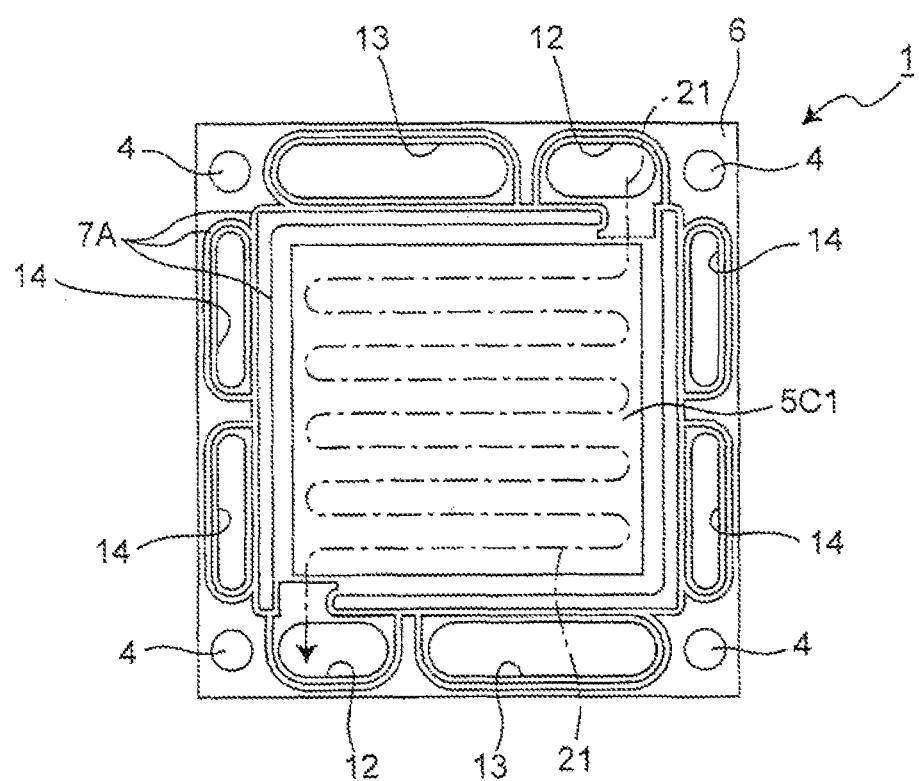
FIG. 5 is a plan view showing a surface structure of the electrode-membrane-frame assembly in FIG. 1 on a side of an anode separator.
Figure 6:
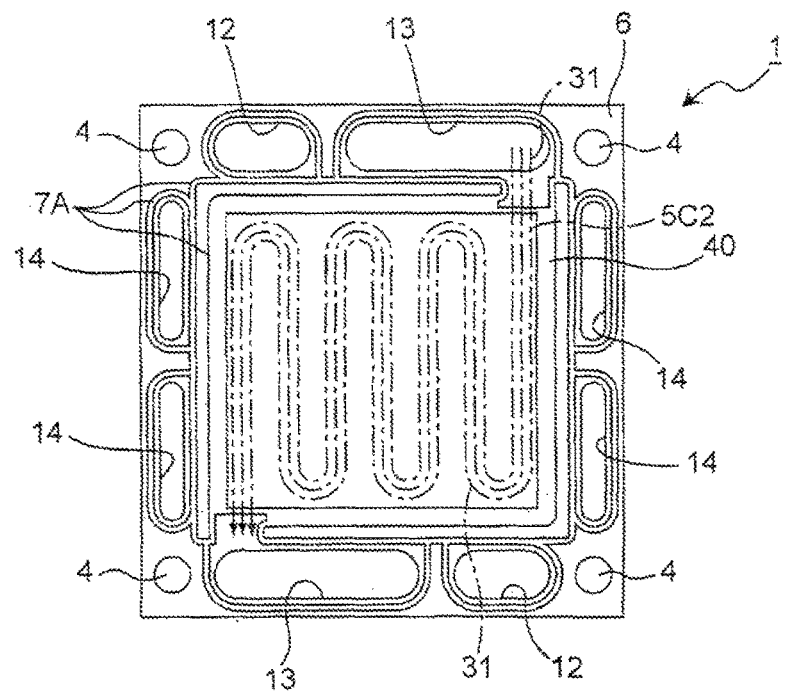
FIG. 6 is a plan view showing a surface structure of the electrode-membrane-frame assembly in FIG. 1 on a side of a cathode separator.

A description will be given of a structure of a fuel cell having an electrode-membrane-frame assembly according to a first embodiment of the present invention with reference to FIGS. 1 to 5. FIG. 1 is a perspective view schematically showing a partially exploded structure of the fuel cell having the electrode-membrane-frame assembly according to the first embodiment. FIG. 2 is a view showing a partially exploded stacked cross-section of a cell taken along a line II-II in FIG. 1. FIG. 3 is a plan view schematically showing a configuration of the electrode-membrane-frame assembly in FIG. 1. FIG. 4 is a cross-sectional view taken along a line IV-IV in FIG. 3. FIG. 5 is a plan view showing a surface structure of the electrode-membrane-frame assembly in FIG. 1 on a side of an anode separator, and FIG. 6 is a plan view showing a surface structure thereof on a side of a cathode separator.

The fuel cell according to the first embodiment is a polymer electrolyte type fuel cell which allows a fuel gas containing hydrogen and an oxidant gas containing oxygen such as air to electrochemically react with each other, such that electric power and heat are produced at the same time. In addition, the present invention is not limited to the polymer electrolyte type fuel cell, and can be applied to various kinds of fuel cells.

As shown in FIG. 1, the fuel cell is configured by a plurality of (such as 60) stacked cells (single cell module) 10 each serving as a basic unit. In addition, a collector plate, an insulating plate, and an end plate are mounted on each end of a group of the stacked cells 10 although they are not shown, and a fastening bolt is inserted into a bolt hole 4 and fixed by a nut, whereby the cells are fastened with a predetermined fastening force (such as 10 kN).

The cell 10 is configured so that an electrode membrane-frame assembly 1 is sandwiched between one paired conductive separators such as an anode separator 2 and a cathode separator 3. The electrode-membrane-frame assembly 1 includes a membrane-electrode assembly 5 (hereinafter, referred to as the MEA), and a frame 6 formed so as to seal and retain a circumferential region 5E of the MEA 5.

As shown in FIG. 2, the MEA 5 is configured by a polymer electrolyte membrane 5A to selectively transport a hydrogen ion, and a paired first and second electrode layers 5D1 and 5D2 (that is, anode and cathode electrode layers) formed on respective surfaces of the electrolyte membranes 5A. The first electrode layer 5D1 has a two-layer structure of a first catalyst layer 5B1 and a first gas diffusion layer 5C1. Similarly, the second electrode layer 5D2 has a two-layer structure of a second catalyst layer 5B2 and a second gas diffusion layer 5C2. The first gas diffusion layer 5C1 is smaller in outline size than the first catalyst layer 5B1, and arranged on a main surface of the first catalyst layer 5B1 such that a circumferential region of the first catalyst layer 5B1 is exposed. Thus, the circumferential region of the first catalyst layer 5B1 is positioned on an outer side of a circumferential region of the first gas diffusion layer 5C1 when viewed from a thickness direction of the polymer electrolyte membrane 5A. Similarly, the second gas diffusion layer 5C2 is smaller in outline size than the second catalyst layer 5B2, and arranged on a main surface of the second catalyst layer 5B2 such that a circumferential region of the second catalyst layer 5B2 is exposed. Thus, the circumferential region of the second catalyst layer 5B2 is positioned on an outer side of a circumferential region of the second gas diffusion layer 5C2 when viewed from the thickness direction of the polymer electrolyte membrane 5A.

The polymer electrolyte membrane 5A is constituted by a solid polymer material showing proton conductivity, such as a perfluorosulfonic acid membrane (Nafion membrane produced by Du Pont Company). The first and second catalyst layers 5B1 and 5B2 are porous members containing, as its main component, carbon powder bearing a platinum group metal catalyst, and are formed on a surface of the polymer electrolyte membrane 5A. The first and second gas diffusion layers 5C1 and 5C2 each have both of air permeability of a fuel gas or an oxidant gas and electron conductivity, and they are formed on the surfaces of the first and second catalyst layers 5B1 and 5B2, respectively.

As the first and second gas diffusion layers 5C1 and 5C2, a porous member containing, as its main components, conductive particles and a polymer resin can be used without using carbon fiber as a base material. In addition, as the first and second gas diffusion layers 5C1 and 5C2, a conductive base material having a porous structure produced with carbon woven cloth or carbon unwoven cloth can be used to have gas permeability. In this case, with a view to obtaining sufficient drainage properties, a water-shedding polymer such as a fluorine resin may be dispersed in the first gas diffusion layer 5C1 and/or the second gas diffusion layer 5C2. In addition, with a view to facilitating and surely performing water management in the membrane-electrode assembly 5, a water-shedding carbon layer constituted by a water-shedding polymer and carbon powder may be provided on a main surface of the first gas diffusion layer 5C1 on the side of the first catalyst layer 5B1 and/or a main surface of the second gas diffusion layer 532 on the side of the second catalyst layer 5B2.

As shown in FIGS. 3 and 4, the frame 6 is configured by three frame-like members such as a first molded body 61, a second molded body 62, and a third molded body 63. The first molded body 61 is arranged on the circumferential region of the first catalyst layer 5B1 close to the first gas diffusion layer 5C1. That is, the first molded body 61 is arranged on the outer side of the circumferential region of the first gas diffusion layer 5C1 when viewed from the thickness direction of the polymer electrolyte membrane 5A. Thus, at least an inner edge part of the first molded body 61 is arranged so as to overlap with the circumferential region of the first catalyst layer 5B1 when viewed from the thickness direction of the polymer electrolyte membrane 5A. The second molded body 62 is arranged on the circumferential region of the second catalyst layer 5B2 close to the second gas diffusion layer 5C2. That is, the second molded body 62 is arranged on the outer side of the circumferential region of the second gas diffusion layer 5C2 when viewed from the thickness direction of the polymer electrolyte membrane 5A. Thus, at least an inner edge part of the second molded body 62' is positioned so as to overlap with the circumferential region of the second catalyst layer 5B2 when viewed from the thickness direction of the polymer electrolyte membrane 5A. The third molded body 63 is configured so as to integrally connect the first molded body 61 to the second molded body 62 around a circumferential region of the MEA 5.

The first molded body 61, the second molded body 62, and the third molded body 63 are formed by injection molding using a thermoplastic resin as a resin material. The first molded body 61 and the second molded body 62 are previously formed by injection molding before the first molded body 61 and the second molded body 62 are arranged on the first catalyst layer 5B1 and the second catalyst layer 5B2, respectively. Therefore, the thermoplastic resin constituting the first and second molded bodies 61 and 62 are not partially mixed with and present in the porous first catalyst layer 5B1 and the porous second catalyst layer 5B2, respectively. Meanwhile, the third molded body 63 is formed by injection molding such that the first molded body 63 partially overlaps with the circumferential region of the second catalyst layer 5B2 when viewed from the thickness direction of the polymer electrolyte membrane 5A after the first and second molded bodies 61 and 62 are arranged on the first and second catalyst layers 5B1 and 5B2, respectively. Preferably, the molten thermoplastic resin constituting the third molded body 63 partially melts and flows in the porous second catalyst layer 5B2 at the time of injection molding so as to be mixed with and present in a part of the circumferential region of the second catalyst layer 5B2. Due to the third molded body 63 (due to anchor effect), adhesion between the frame 6 and the MEA 5 is improved. In addition, with a view to improving the adhesion between the frame 6 and the MEA 5, a contact width W1 between the third molded body 63 and the second catalyst layer 5B2 in a surface direction is preferably 1 mm or more.

In addition, it is preferable that the second molded body 62 is arranged on the circumferential region of the second catalyst layer 5B2 such that a whole of the main surface of the circumferential region of the second catalyst layer 5B2 is exposed, and that the third molded body 63 is formed by injection molding such that the third molded body 63 partially overlaps with the exposed whole of the circumferential region of the second catalyst layer 5B2 when viewed from the thickness direction of the polymer electrolyte membrane 5A. In this configuration, the thermoplastic resin constituting the third molded body 63 can be partially mixed with and present in the whole of the circumferential region of the second catalyst layer 5B2, so that the adhesion between the frame 6 and the MEA 5 can be enhanced all over the whole of the circumferential region of the second catalyst layer 5B2. In addition, the fuel gas and the oxidant gas can be prevented from leaking from between the first catalyst layer 5B1 and the second catalyst layer 5B2 through the circumferential region of the second catalyst layer 5B2.

In addition, it is preferable that the thermoplastic resin used for injection molding the first and second molded bodies 61 and 62 is chemically clean and stable at an operation temperature of the fuel cell or less, and has an appropriate elastic modulus and a relatively high heat distortion temperature. For example, in a case where a width of a fuel gas flow channel groove 21 of the anode separator 2 and a width of an oxidant gas flow channel groove 31 of the cathode separator 3 which will be described below are about 1 to 2 mm, and a thickness of the frame 6 is about 1 mm or less, a compressive elastic modulus of the thermoplastic resin is preferably at least 2,000 Mpa or more. Here, the elastic modulus means the compressive elastic modulus measured by a method for measuring the compressive elastic modulus determined by JIS-K7181. In addition, since the operation temperature of the fuel cell is 90° C. or less in general, the heat distortion temperature of the thermoplastic resin is preferably 120° C. or more.

In addition, the thermoplastic resin used for the first and second molded bodies 61 and 62 is preferably a crystalline resin instead of a non-crystalline resin in terms of chemical stability, and among them, it is preferably a resin having high mechanical strength and high heat resistance. For example, the thermoplastic resin is suitably a super engineering plastic grade such as polyphenylene sulfide (PPS), polyether ether ketone (PEEK), liquid crystal polymer (LCD), or polyether nitrile (PEN). They are suitable because they have a compressive elastic modulus of several thousands to several tens of thousands of Pa and a heat distortion temperature of 150° C. or more. In addition, even in a case of a general-purpose resin material, polypropylene filled with a glass filler (GFPP) has an elastic modulus which is several times as high as that (compressive elastic modulus: 1,000 to 1,500 Ma) of polypropylene filled with nothing, and has a heat distortion temperature of about 150° C., so that it can be suitably used as the above thermoplastic resin.

In addition, the third molded body 63 may be formed of the same resin material as that of the first and second molded bodies 61 and 62. In this case, since a bonding force is stronger in a case where the same material is bonded than a case where different materials are bonded, the third molded body 63 can be easily formed by injection molding and integrally connected to the frame.

In addition, the third molded body 63 may be formed of a material having a compressive elastic modulus lower than that of the first molded body 61 and the second molded body 62. In this case, since the first molded body 61 and the second molded body 62 are connected by the material having the low compressive elastic modulus, for example, mechanical stress applied on the polymer electrolyte membrane 5A can be reduced at the time of handling, so that the polymer electrolyte membrane 5A can be prevented from mechanically deteriorating. As a suitable material for the third molded body 63, the material may be the same as a thermoplastic resin or a thermoplastic elastomer used for a gasket 7 which will be described below. For example, polypropylene not filled with a glass filler may be used.

As shown in FIG. 2, a groove part 6A is formed in each main surface of the frame 6, and the gasket 7 fits in the groove part 6A. The electrode-membrane-frame assembly 1 is sandwiched between the anode separator 2 and the cathode separator 3 with the gasket 7 interposed therebetween. The gasket 7 is configured by an elastic body and deforms when the anode separator 2 and the cathode separator 3 are pressed toward the electrode-membrane-frame assembly 1 at the time of fastening the cell 10, whereby the MEA 5 is sealed. A detailed configuration of the gasket 7 will be described below.

Each of the anode separator 2 and the cathode separator 3 is formed roughly into a flat plate. Level difference parts 25 and 35 are formed in surfaces (that is, inner surfaces) of the anode separator 2 and cathode separator 3, respectively on the side which is in contact with the electrode-membrane-frame assembly 1 so as to correspond to the shape of the electrode-membrane-frame assembly 1, more specifically, level difference parts generated due to a difference in thickness between the frame 6 and the MEA 5. That is, the inner surfaces of the anode separator 2 and the cathode separator 3 are formed such that their center parts project to be in the form of a trapezoid.

The anode separator 2 and the cathode separator 3 are each constituted by a conductive material which is not permeable to a gas. The anode separator 2 and the cathode separator 3 are produced such that a resin-impregnated carbon material is cut into a predetermined shape, or a mixture of carbon powder and a resin material is molded.

As shown in FIG. 1, the anode separator 2, the cathode separator 3, and the frame 6 have fuel gas manifold holes 12, 22, and 32 each serving as one paired through holes for flowing the fuel gas, respectively. In addition, as shown in FIG. 1, the anode separator 2, the cathode separator 3, and the frame 6 have oxidant gas manifold holes 13, 23, and 33 each serving as one paired through holes for flowing the oxidant gas, respectively. When the anode separator 2, the cathode separator 3, and the frame 6 are fastened as the cell 10, the fuel gas manifold holes 12, 22, and 32 are coupled to form a fuel gas manifold. Similarly, when the anode separator 2, the cathode separator 3, and the frame 6 are fastened as the cell 10, the oxidant gas manifold holes 13, 23, and 33 are coupled to form an oxidant gas manifold.

In addition, as shown in FIG. 1, the anode separator 2, the cathode separator 3, and the frame 6 have cooling medium manifold holes 14, 24, and 34 serving as two paired through holes for flowing a cooling medium (such as pure water or ethylene glycol), respectively. Thus, when the anode separator 2, the cathode separator 3, and the frame 6 are fastened as the cell 10, these cooling medium manifold holes 14, 24, and 34 are couple to form two paired cooling medium manifolds.

In addition, as shown in FIG. 1, the anode separator 2, the cathode separator 3, and the frame 6 each have four bolt holes 4 near corner parts. A fastening bolt is inserted into the bolt hole 4, and a nut is connected to the fastening bolt, whereby the cell 10 is fastened.

The fuel gas flow channel groove 21 is provided in the inner main surface of the anode separator 2 (surface on the side of the electrode-membrane-frame assembly 1) to connect the one paired fuel gas manifold holes 22 and 22. The fuel gas flow channel groove 21 is configured by a first gas diffusion layer contact portion 21A formed on the surface which is in contact with the first gas diffusion layer 5C1 in a state that the cell 10 is assembled, and a connecting portion (connecting flow channel groove) 21B to connect the contact portion 21A to the fuel gas manifold hole 22. Thus, the fuel gas flows from the fuel gas manifold 22 on a supply side into the first gas diffusion layer contact portion 21A through the connecting portion 21B on the supply side, and comes in contact with the first gas diffusion layer 5C1. In addition, a surplus gas of the fuel gas and a reaction generation component after passing through the first gas diffusion layer contact portion 21A are discharged to the fuel gas manifold 22 on a discharge side through the connecting portion 21B on the discharge side. In addition, in FIG. 5, one-dot broken line shows a position in which the fuel gas flow channel groove 21 is in contact with the frame 6 or is opposed thereto in the state that the cell 10 is assembled.

In addition, the oxidant gas flow channel groove 31 is provided in the inner main surface of the cathode separator 3 (surface on the side of the electrode-membrane-frame assembly 1) to connect the paired oxidant gas manifold holes 33 and 33. The oxidant gas flow channel groove 31 is configured by a second gas diffusion layer contact portion 31A formed on the surface which is in contact with the second gas diffusion layer 5C2 in the state that the cell 10 is assembled, and a connecting portion (connecting flow channel groove) 31B to connect the contact portion 31A to the oxidant gas manifold hole 33. Thus, the oxidant gas flows from the oxidant gas manifold 32 on a supply side into the second gas diffusion layer contact portion 31A through the connecting portion 31B on the supply side, and comes in contact with the second gas diffusion layer 5C2. In addition, a surplus gas of the oxidant gas and a reaction generation component after passing through the second gas diffusion layer contact portion 31A are discharged to the oxidant gas manifold 32 on a discharge side through the connecting portion 31B on the discharge side. In addition, in FIG. 6, one-dot broken line shows a position to which the oxidant gas flow channel groove 31 is in contact or is opposed in the state that the cell 10 is assembled.

As described above, the fuel gas flowing through the fuel gas flow channel groove 21 comes in contact with the first gas diffusion layer 5C1, and the oxidant gas flowing through the oxidant gas flow channel groove 31 comes in contact with the second gas diffusion layer 5C2, whereby an electrochemical reaction is generated in the fuel cell. Thus, electric power and heat are produced at the same time.

As shown in FIG. 2, a cooling medium flow channel groove 50 is formed in an outer main surface (rear surface) of each of the anode separator 2 and the cathode separator 3. The cooling medium flow channel groove 50 is formed to connect the two paired cooling medium manifold holes 24 and 34. That is, each cooling medium from the cooling medium manifold on a supply side branches off to the cooling medium flow channel groove 50 and reaches the cooling medium manifold on a discharge side. Thus, the cell 10 can be kept at a predetermined temperature suitable for the electrochemical reaction by use of a heat transfer ability of the cooling medium.

In addition, each hole and each groove can be formed by cutting work or molding work. In addition, the fuel gas manifold, the oxidant gas manifold, and the cooling medium manifold are not limited to the above configuration, and can be variously changed in shape. For example, each manifold may be an external manifold structure. In addition, the hole is not shown in FIGS. 3 and 4.

The gasket 7 includes an annular part 7A which surrounds the one paired fuel gas manifold holes 12, the one paired oxidant gas manifold holes 13, and the two paired cooling medium manifold holes 14, and surrounds the first and second gas diffusion layers 5C1 and 5C2 of the MEA 5. As shown in FIG. 5, on the side of the anode separator 2, the annular part 7A is formed so as to integrally surround the fuel gas manifold hole 12 and the MEA 5 except for a position corresponding to the connecting portion 21B of the fuel gas flow channel groove 21. In addition, as shown in FIG. 6, on the side of the cathode separator 3, the annular part 7A is formed so as to integrally surround the oxidant gas manifold hole 13 and the MEA 5 except for a position corresponding to the connecting portion 31B of the oxidant gas flow channel groove 31. Thus, the fuel gas and the oxidant gas are prevented from flowing outside the fuel gas flow channel groove 21 and the oxidant gas flow channel groove 31, respectively.

In addition, as shown in FIG. 2, a rib 7B is formed on a top surface of the annular part 7A of the gasket 7. The rib 7B is in contacts with the anode separator 2 or the cathode separator 3 and is crushed in the state that the cell 10 is assembled. As a result, a fastening force of the cell 10 concentrates on a part of the rib 7B, so that circumferential region s of the manifold holes 12, 13, and 14, and the MEA 5 can be more surely sealed. That is, due to the rib 7B, the gasket 7 can more surely seal them. Thus, fluids passing through the manifold holes 12, 13, and 14 can be prevented from leaking from the manifold holes 12, 13, and 14, and its pressure increases.

In addition, the ribs 7B and 7B positioned closest to the first and second gas diffusion layers 5C1 and 5C2 are preferably positioned closer to the first and second gas diffusion layers 5C1 and 5C2 than an outer edge of the polymer electrolyte membrane 5A. In this configuration, the ribs 7B and 7B opposed to each other sandwich the circumferential region 5E of the MEA 5 with the frame 6 interposed therebetween by the above-described fastening force provided in the state that the cell 10 is assembled, so that the adhesion and bonding force between the circumferential region 5E of the MEA 5 and the frame 6 can be enhanced.

In addition, the gasket 7 is constituted by a thermoplastic resin or a thermoplastic elastomer serving as one example of a resin material. It is preferable that the thermoplastic resin or the thermoplastic elastomer is chemically stable (especially, not to be hydrolyzed) at the operation temperature or less of the fuel cell and has hydrothermal resistance. A compressive elastic modulus of the gasket 7 is preferably 200 Mpa or less.

The gasket 7 is preferably formed of at least one kind selected from a group of polyethylene, polypropylene (PP), ethylene-propylene-diene methylene linkage (EPDM), polybutylene, polystyrene, polyvinyl chloride, polyvinylidene chloride, polyvinyl alcohol, polyacrylamide, polyamide, polycarbonate, polyacetal, polyurethane, silicone, a fluorine resin, polybutylene terephthalate, polyethylene terephthalate, polyethylene naphthalate, syndiotactic polystyrene, polyphenylene sulfide, polyether ether ketone, polyether ketone, a liquid crystal polymer, polyether nitrile, modified polyphenylene ether, polysulfone, polyether sulfone, polyarylate, polyamide imide, polyether imide, and thermoplastic polyimide. Thus, preferable sealing properties can be ensured in a fastening load of the fuel cell. According to the first embodiment, the material is Santoprene 8101-55 (produced by Advanced Elastomer Systems) which is a polyolefin group thermoplastic elastomer having PP and EPDM.

A general sealing member 9 such as a squeezed packing made of a heat-resistant material is arranged around the manifold hole in the outer main surface (rear surface) of each of the anode separator 2 and the cathode separator 3. Thus, the fuel gas, the oxidant gas, the cooling medium can be prevented from leaking from the connecting portions of the manifold holes 22, 23, 24, 32, 33, and 34 between the adjacent cells 10 and 10.

Figure 7A:
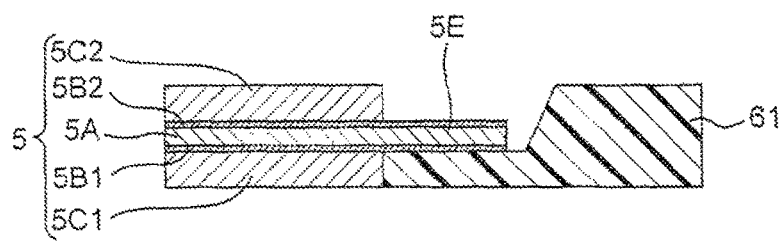
FIG. 7A is a schematic cross-sectional view showing a step of producing the electrode-membrane-frame assembly in FIG. 1, in which a connection part between a circumferential region of a MEA and a frame is overdrawn.
Figure 7B:
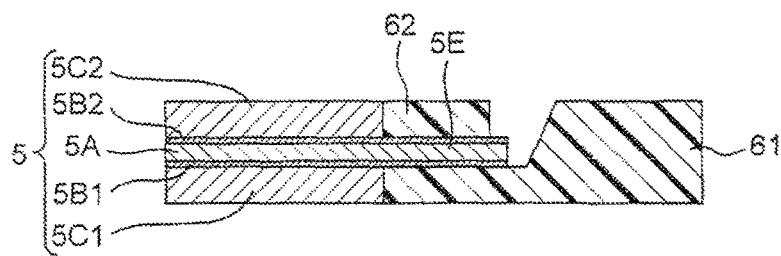
FIG. 7B is a schematic cross-sectional view showing a step after FIG. 7A.
Figure 7C:
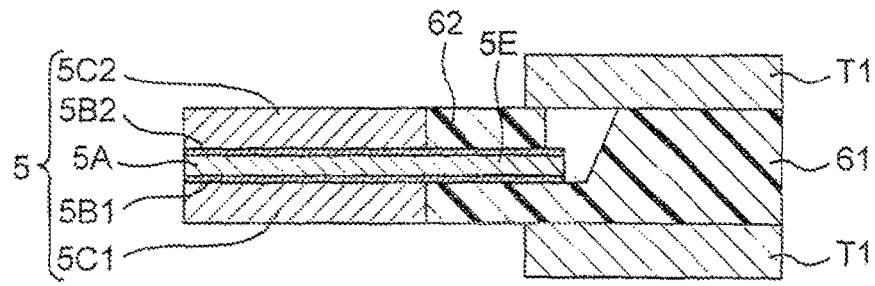
FIG. 7C is a schematic cross-sectional view showing a step after FIG. 7B.

Next, a description will be given of a method for producing the electrode-membrane-frame assembly 1. FIGS. 7A to 7C are schematic cross-sectional views showing steps of producing the electrode-membrane-frame assembly 1, in which a connection part between the circumferential region 5E of the MEA 5 and the frame 6 is overdrawn. Here, it is assumed that the first molded body 61 and the second molded body 62 have been previously formed by injection molding and the MEA 3 has been previously produced.

First, as shown in FIG. 7A, the first molded body 61 is arranged on the circumferential region of the first catalyst layer 5B1 close to the first gas diffusion layer 5C1 of the MEA 5. That is, the first molded body 61 is arranged on the outer side of the circumferential region of the first gas diffusion layer 5C1 when viewed from the thickness direction of the polymer electrolyte membrane 5A. Thus, at least the inner edge part of the first molded body 61 is positioned so as to overlap with the circumferential region of the first catalyst layer 5B1 when viewed from the thickness direction of the polymer electrolyte membrane 5A.

Then, as shown in FIG. 7B, the second molded body 62 is arranged on the circumferential region of the second catalyst layer 5B2 close to the second gas diffusion layer 5C2 of the MEA 5. That is, the second molded body 62 is arranged on the outer side of the circumferential region of the second gas diffusion layer 5C2 when viewed from the thickness direction of the polymer electrolyte membrane 5A. In addition, at this time, the second molded body 62 is arranged such that the main surface of the circumferential region of the second catalyst layer 5B2 is partially exposed. Thus, at least the inner edge part of the second molded body 62 is positioned so as to overlap with the circumferential region of the second catalyst layer 5B2 when viewed from the thickness direction of the polymer electrolyte membrane 5A.

Then, as shown in FIG. 7C, the first molded body 61 and the second molded body 62 are sandwiched by one paired dies T1, around the circumferential region 5E of the MEA 5, and a molten thermoplastic resin is poured into a gap formed between the first molded body 61 and the second molded body 62 in one paired dies, whereby the third molded body 63 is formed by injection molding. Thus, the third molded body 63 partially overlaps with a part of the circumferential region of the second catalyst layer 5B2 when viewed from the thickness direction of the polymer electrolyte membrane 5A. At this time, preferably, the molten thermoplastic resin is partially mixed with and present in one part of the main surface of the circumferential region of the second catalyst layer 5B2.

As described above, the electrode-membrane-frame assembly 1 shown in FIG. 4 is produced.

According to the first embodiment, the previously molded first molded body 61 is arranged on the circumferential region of the first catalyst layer 5B1 close to the first gas diffusion layer 5C1, and the previously molded second molded body 62 is arranged on the circumferential region of the second catalyst layer 5B2 close to the second gas diffusion layer 5C2. In addition, the third molded body 63 is not directly in contact with an inner region of the (second) main surface of the polymer electrolyte membrane 5A positioned on an inner side of an outer edge part 62-1 of the second molded body 62 when viewed from the thickness direction of the polymer electrolyte membrane 5A. That is, the high-temperature and high-pressure thermoplastic resin is prevented from being directly in contact with the polymer electrolyte membrane 5A in the vicinity of a power generation region. Thus, the polymer electrolyte membrane 5A can be prevented from deteriorating, and power generation performance can be prevented from being lowered. Here, the power generation region means a part in which the first gas diffusion layer 5C1 and the second gas diffusion layer 5C2 overlap with each other when viewed from the thickness direction of the polymer electrolyte membrane 5A.

In addition, according to the first embodiment, the first molded body 61 and the second molded body 62 are integrally connected by injection molding the third molded body 63, so that the adhesion between the frame 6 and the MEA 5 can be enhanced.

In addition, according to the first embodiment, the frame 6 is configured by the three molded bodies (first to third molded bodies 61, 62, and 63), and the first molded body 61 and the second molded body 62 are integrally connected by the third molded body 63, so that the first molded body 61 and the second molded body 62 are not necessarily formed by injection molding. Thus, the polymer electrolyte membrane 5A can be prevented from deteriorating.

In addition, the present invention is not limited to the above embodiment, and can be implemented in various ways. For example, while the first molded body 61 and the second molded body 62 are constituted by the same resin material in the above, the first molded body 61 and the second molded body 62 may be constituted by different materials having different degrees of hardness. For example, the first molded body 61 may be constituted by a hard material (such as a thermoplastic resin), and the second molded body 62 may be constituted by a soft material (such as a thermoplastic elastomer). In this case, since the first molded body 61 is a hard member, a shape as the electrode-membrane-frame assembly 1 can be kept (maintained). That is, the electrode-membrane-frame assembly 1 can be prevented from being deflected or bent. Meanwhile, since the second molded body 62 is a soft member (elastic body), the fastening pressure applied to the polymer electrolyte membrane 5A when the cell 10 is fastened can be released, so that the polymer electrolyte membrane 5A can be prevented from mechanically deteriorating.

In addition, a bonding force is stronger in the case where the same material is bonded than in the case where the different materials are bonded. Therefore, the first molded body 61 and/or the second molded body 62 may have a multilayer structure having a thermoplastic resin layer and a thermoplastic elastomer layer. In this case, the connection properties with the third molded body 63 can be enhanced due to the thermoplastic resin layer, and the fastening pressure applied to the MEA 5 when the cell 10 is fastened can be relieved due to the thermoplastic elastomer layer. In addition, the thermoplastic elastomer layer is preferably in contact with the first catalyst layer 5B1 and/or the second catalyst layer 5B2 with a view to relieving the fastening pressure.

In addition, while the first molded body 61 is arranged on the anode side, and the second molded body 62 is arranged on the cathode side in the first embodiment, the first molded body 61 may be arranged on the cathode side, and the second molded body 62 may be arranged on the anode side.

According to the first embodiment, the circumferential region of the first catalyst layer 5B1 is arranged on the outer side of the circumferential region of the first gas diffusion layer 5C1 over the whole, and the circumferential region of the second catalyst layer 5B2 is arranged on the outer side of the circumferential region of the second gas diffusion layer 5C2 over the whole when viewed from the thickness direction of the polymer electrolyte membrane 5A. In this configuration, the inner edge part of the first frame 61 is not directly in contact with the polymer electrolyte membrane 5A in the vicinity of the circumferential region of the first gas diffusion layer 5C1, and the inner edge part of the second frame 62 is not directly in contact with the polymer electrolyte membrane 5A in the vicinity of the circumferential region of the second gas diffusion layer 5C2. Therefore, mechanical stress applied to the polymer electrolyte membrane 5A can be reduced, and the polymer electrolyte membrane 5A can be prevented from deteriorating. In addition, as long as the above effect can be provided, the circumferential region of the first catalyst layer 5B1 may be partially arranged on an inner side of the circumferential region of the first gas diffusion layer 5C1, and the circumferential region of the second catalyst layer 5B2 may be partially arranged on an inner side of the circumferential region of the second gas diffusion layer 5C2.

In addition, according to the first embodiment, at least the inner edge part of the first molded body 61 is arranged to overlap with the circumferential region of the first catalyst layer 5B1 when viewed from the thickness direction of the polymer electrolyte membrane 5A, but the present invention is not limited to this. For example, at least the inner edge part of the first molded body 61 may be arranged on one main surface side of the polymer electrolyte membrane 5A so as to overlap with the circumferential region of the polymer electrolyte membrane 5A when viewed from the thickness direction of the polymer electrolyte membrane 5A. In addition, at least the inner edge part of the second molded body 62 is arranged to overlap with the circumferential region of the second catalyst layer 5B2 when viewed from the thickness direction of the polymer electrolyte membrane 5A, but the present invention is not limited to this. For example, at least the inner edge part of the second molded body 62 may be arranged on the other main surface side of the polymer electrolyte membrane 5A so as to overlap with the circumferential region of the polymer electrolyte membrane 5A when viewed from the thickness direction of the polymer electrolyte membrane 5A. In this configuration also, the high-temperature and high-voltage thermoplastic resin is not directly in contact with the polymer electrolyte membrane 5A in the vicinity of the power generation region, so that the polymer electrolyte membrane 5A can be prevented from deteriorating.

In addition, according to the first embodiment, the circumferential region of the first catalyst layer 5B1 is arranged on the outer side of the circumferential region of the first gas diffusion layer 5C1 over the whole, and the circumferential region of the second catalyst layer 5B2 is arranged on the outer side of the circumferential region of the second gas diffusion layer 5C2 over the whole when viewed from the thickness direction of the polymer electrolyte membrane 5A, but the present invention is not limited to this. For example, the circumferential region of the first catalyst layer 5B1 may be arranged on the inner side of the circumferential region of the first gas diffusion layer 5C1, or the first catalyst layer 5B1 and the first gas diffusion layer 5C1 may have the same size. For example, the circumferential region of the second catalyst layer 5B2 may be arranged on the inner side of the circumferential region of the second gas diffusion layer 5C2, or the second catalyst layer 5B2 and the second gas diffusion layer 5C2 may have the same size. In this configuration also, the high-temperature and high-voltage thermoplastic resin is not directly in contact with the polymer electrolyte membrane 5A in the vicinity of the power generation region, so that the polymer electrolyte membrane 5A can be prevented from deteriorating.

In addition, according to the first embodiment, the circumferential region of the first gas diffusion layer 5C1 coincides with the Circumferential region of the second gas diffusion layer 5C2 when viewed from the thickness direction of the polymer electrolyte membrane 5A, but the present invention is not limited to this. For example, the circumferential region of the first gas diffusion layer 5C1 and the circumferential region of the second gas diffusion layer 5C2 may be arranged so as to be shifted in a surface direction of the polymer electrolyte membrane 5A.

In addition, according to the first embodiment, when the electrode-membrane-frame assembly 1 is produced, the MEA 5 has been previously produced, but the present invention is not limited to this. For example, the electrode-membrane-frame assembly 1 may be produced as shown in FIGS. 8A to 8D. FIGS. 8A to 8D are schematic cross-sectional views showing steps of producing the electrode-membrane-frame assembly 1, in which a connection part between the circumferential region 5E of the MEA 5 and the frame 6 is overdrawn. Here, it is assumed that the first molded body 61 and the second molded body 62 have been previously formed by injection molding.

Figure 8A:
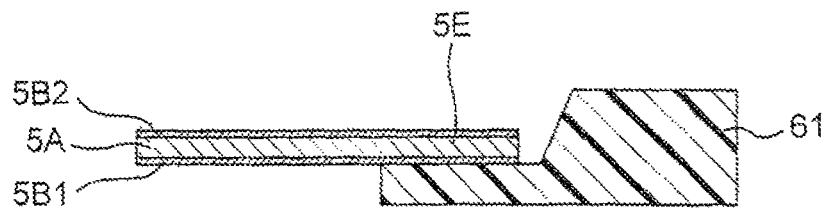
FIG. 8A is a schematic cross-sectional view showing a production step other than the production steps of the electrode-membrane-frame assembly shown in FIGS. 7A to 7C, in which a connection part between a circumferential region of a MEA and a frame is overdrawn.

First, as shown in FIG. 8A, the first molded body 61 is arranged on the circumferential region of the first catalyst layer 5B1 of the MEA 5. Thus, at least the inner edge part of the first molded body 61 is positioned so as to overlap with the circumferential region of the first catalyst layer 5B1 when viewed from the thickness direction of the polymer electrolyte membrane 5A.

Figure 8B:
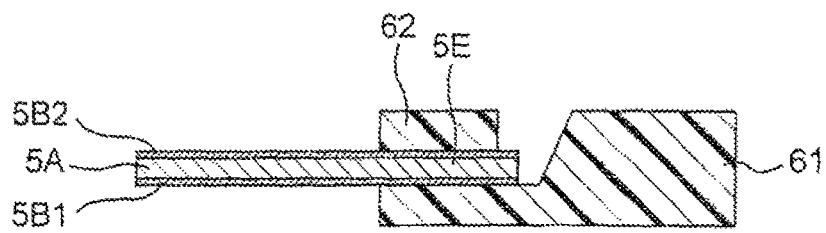
FIG. 8B is a schematic cross-sectional view showing a step after FIG. 8A.

Then, as shown in FIG. 8B, the second molded body 62 is arranged on the circumferential region of the second catalyst layer 5B2 of the MEA 5. Thus, at least the inner edge part of the second molded body 62 is positioned so as to overlap with the circumferential region of the second catalyst layer 5B2 when viewed from the thickness direction of the polymer electrolyte membrane 5A. In addition, at this time, the second molded body 62 is arranged such that the main surface of the circumferential region of the second catalyst layer 5B2 is partially exposed.

Figure 8C:
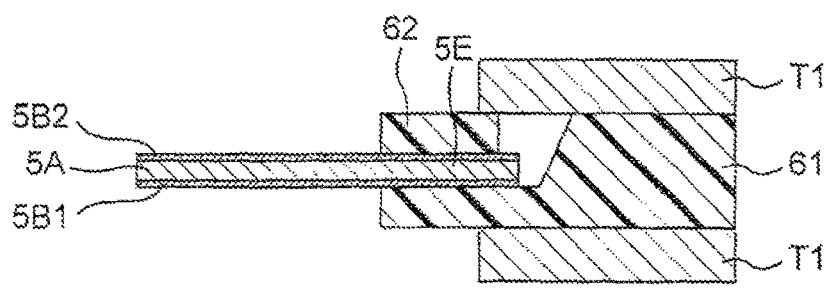
FIG. 8C is a schematic cross-sectional view showing a step after FIG. 8B.
Figure 8D:
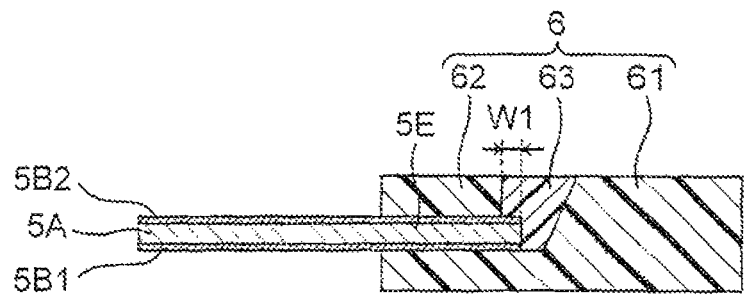
FIG. 8D is a schematic cross-sectional view showing a step after FIG. 8C.

Then, as shown in FIGS. 8C and 8D, the first molded body 61 and the second molded body 62 are sandwiched by one paired dies T1, around a circumferential region 5E of the MEA 5, and a molten thermoplastic resin is poured into a gap formed between the first molded body 61 and the second molded body 62 in the one paired dies T1, whereby the third molded body 63 is formed by the injection molding. Thus, the third molded body 63 partially overlaps with one part of the circumferential region of the second catalyst layer 5B2 when viewed from the thickness direction of the polymer electrolyte membrane 5A. At this time, preferably, the molten thermoplastic resin is partially mixed with and present in the one part of the main surface of the circumferential region of the second catalyst layer 5B2.

After that, the first gas diffusion layer 5C1 is arranged on the inner side of the inner edge part of the first molded body 61, and the second gas diffusion layer 5C2 is arranged on the inner side of the inner edge part of the second molded body 62 when viewed from the thickness direction of the polymer electrolyte membrane 5A.

As described above, the electrode-membrane-frame assembly 1 shown in FIG. 4 is produced.

Second Embodiment

Figure 9:
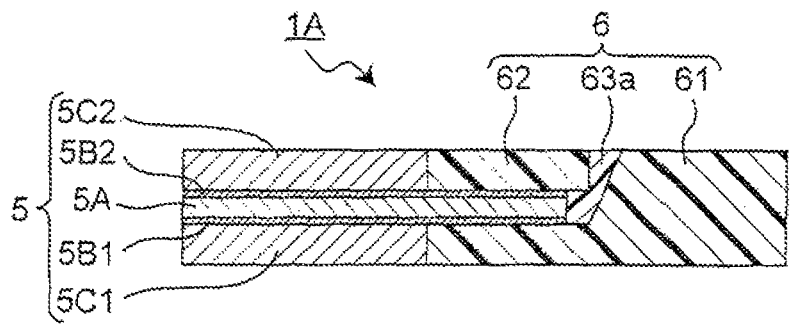
FIG. 9 is a schematic cross-sectional view showing an electrode-membrane-frame assembly according to a second embodiment of the present invention, in which a connection part between a circumferential region of a MEA and a frame is overdrawn.

FIG. 9 is a schematic cross-sectional view showing an electrode-membrane-frame assembly according to a second embodiment of the present invention, in which a connection part between a circumferential region of a MEA and a frame is overdrawn. An electrode-membrane-frame assembly 1A according to the second embodiment differs from the electrode-membrane-frame assembly 1 according to the first embodiment in that a third molded body 63a is not in contact with the main surface of the circumferential region of the second catalyst layer 5B2.

According to the second embodiment, since the injection-molded third molded body 63a is not in contact with the main surface of the circumferential region of the polymer electrolyte membrane 5A, the polymer electrolyte membrane 5A can be more prevented from deteriorating than that of the electrode-membrane-frame assembly 1 according to the first embodiment.

In addition, according to the second embodiment, the circumferential region of the first catalyst layer 5B1 is arranged on the outer side of the circumferential region of the first gas diffusion layer 5C1 over the whole, and the circumferential region of the second catalyst layer 5B2 is arranged on the outer side of the circumferential region of the second gas diffusion layer 5C2 over the whole when viewed from the thickness direction of the polymer electrolyte membrane 5A, but the present invention is not limited to this. For example, the circumferential region of the first catalyst layer 5B1 may be arranged on the inner side of the circumferential region of the first gas diffusion layer 5C1, or the first catalyst layer 5B1 and the first gas diffusion layer 5C1 may have same size. In addition, the circumferential region of the second catalyst layer 5B2 may be arranged on the inner side of the circumferential region of the second gas diffusion layer 5C2, or the second catalyst layer 5B2 and the second gas diffusion layer 5C2 may have the same size. In this configuration also, the high-temperature and high-voltage thermoplastic resin is not directly in contact with the polymer electrolyte membrane 5A in the vicinity of the power generation region, so that the polymer electrolyte membrane 5A can be prevented from deteriorating.

Third Embodiment

Figure 10:
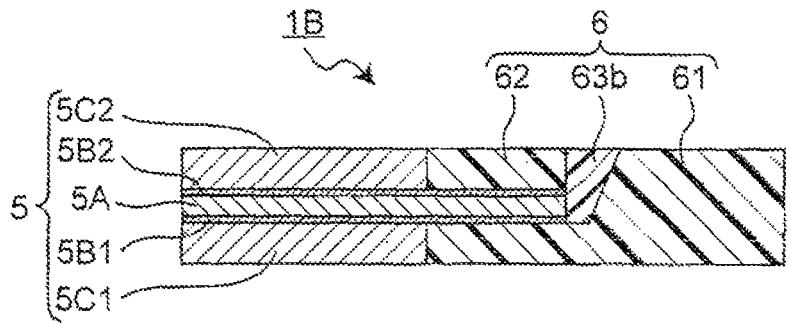
FIG. 10 is a schematic cross-sectional view showing an electrode-membrane-frame assembly according to a third embodiment of the present invention, in which a connection part between a circumferential region of a MEA and a frame is overdrawn.

FIG. 10 is a schematic cross-sectional view showing an electrode-membrane-frame assembly according to a third embodiment of the present invention, in which a connection part between a circumferential region of a MEA and a frame is overdrawn. An electrode-membrane-frame assembly 1B according to the third embodiment differs from the electrode-membrane-frame assembly 1 according to the first embodiment in that a third molded body 63b is not in contact with the main surface of the circumferential region of the second catalyst layer 5B2, similar to the second embodiment.

According to the third embodiment, similar to the second embodiment, since the injection-molded third molded body 63b is not in contact with the main surface of the circumferential region of the polymer electrolyte membrane 5A, the polymer electrolyte membrane 5A can be more prevented from deteriorating than that of the electrode-membrane-frame assembly 1 according to the first embodiment.

Fourth Embodiment

Figure 11:
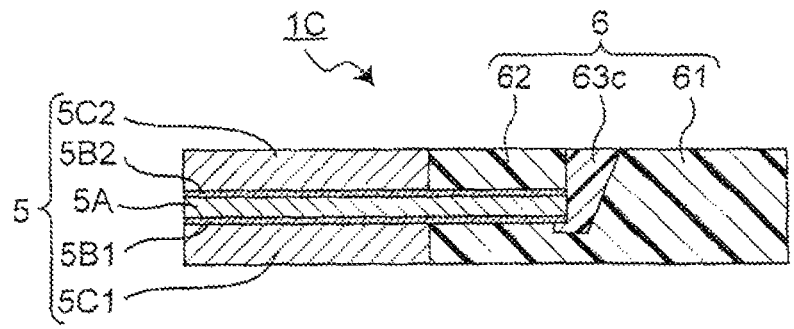
FIG. 11 is a schematic cross-sectional view showing an electrode-membrane-frame assembly according to a fourth embodiment of the present invention, in which a connection part between a circumferential region of a MEA and a frame is overdrawn.

FIG. 11 is a schematic cross-sectional view showing an electrode-membrane-frame assembly according to a fourth embodiment of the present invention, in which a connection part between a circumferential region of a MEA and a frame is overdrawn. An electrode-membrane-frame assembly 1C according to the fourth embodiment differs from the electrode-membrane-frame assembly 1 according to the first embodiment in that a third molded body 63c is not in contact with the main surface of the circumferential region of the second catalyst layer 5B2, and the third molded body 63c is formed to come around to the side of the first catalyst layer 5B1, and be in contact with a part of the main surface of the circumferential region of the first catalyst layer 5B1.

According to the fourth embodiment, a thermoplastic resin constituting the third molded body 63c to be formed by injection molding partially melts and reaches the porous first catalyst layer 5B1 at the time of injection molding, so that it is mixed with and present in the part of the circumferential region of the first catalyst layer 5B1. Due to the third molded body 63c (due to anchor effect), similar to the first embodiment, adhesion between the frame 6 and the MEA 5 is improved.

In addition, it is preferable that the first molded body 61 is arranged on the circumferential region of the first catalyst layer 5B1 such that the whole of the main surface of the circumferential region of the first catalyst layer 5B1 is exposed, and the third molded body 63 is formed by injection molding such that the third molded body 63 partially overlaps with the whole of the circumferential region of the exposed first catalyst layer 5B1 when viewed from the thickness direction of the polymer electrolyte membrane 5A. In this configuration, the thermoplastic resin constituting the third molded body 63c can be partially mixed with and present in the whole of the circumferential region of the first catalyst layer 5B1, so that the adhesion between the frame 6 and the MEA 5 can be enhanced all over the whole of the circumferential region of the first catalyst layer 5B1. In addition, the fuel gas and the oxidant gas can be prevented from leaking from between the first catalyst layer 5B1 and the second catalyst layer 5B2 through the circumferential region of the first catalyst layer 5B1.

Fifth Embodiment

Figure 12:
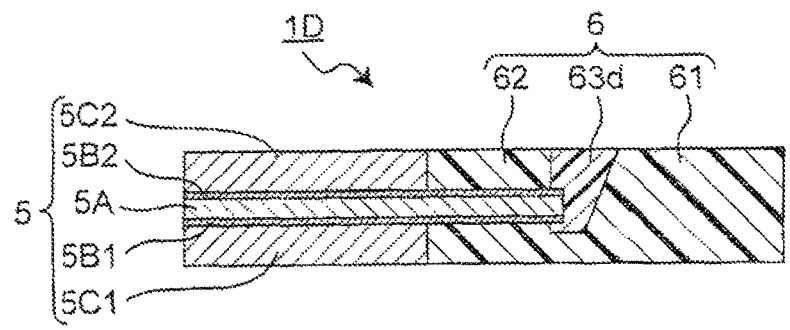
FIG. 12 is a schematic cross-sectional view showing an electrode-membrane-frame assembly according to a fifth embodiment of the present invention, in which a connection part between a circumferential region of a MEA and a frame is overdrawn.

FIG. 12 is a schematic cross-sectional view showing an electrode-membrane-frame assembly according to a fifth embodiment of the present invention, in which a connection part between a circumferential region of a MEA and a frame is overdrawn. An electrode-membrane-frame assembly 1D according to the fifth embodiment differs from the electrode-membrane-frame assembly 1 according to the first embodiment in that a third molded body 63d is formed to come around to the first catalyst layer 5B1 and be in contact with one part of the main surface of the circumferential region of the first catalyst layer 5B1.

According to the fifth embodiment, since the main surface of the circumferential region of each of the first and second catalyst layers 5B1 and 5B2 is partially in contact with the third molded body 63c, adhesion between the frame 6 and the MEA 5 can be further improved.

Sixth Embodiment

Figure 13:
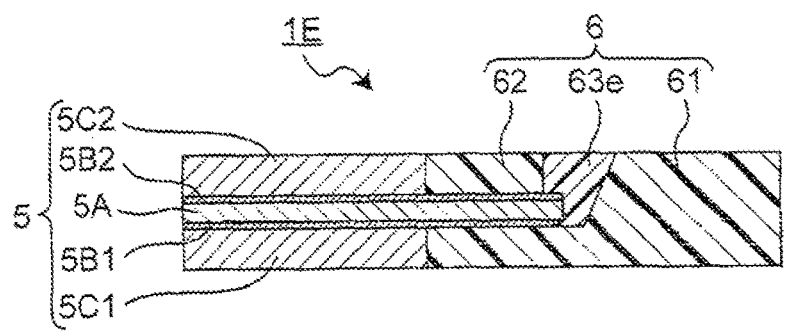
FIG. 13 is a schematic cross-sectional view showing an electrode-membrane-frame assembly according to a sixth embodiment of the present invention, in which a connection part between a circumferential region of a MEA and a frame is overdrawn.
Figure 14:
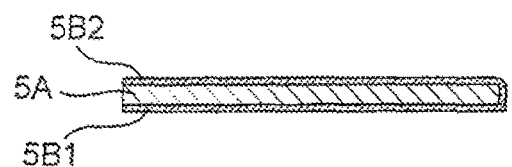
FIG. 14 is a schematic cross-sectional view showing a state in which a short circuit is caused between a first catalyst layer and a second catalyst layer.

FIG. 13 is a schematic cross-sectional view showing an electrode-membrane-frame assembly according to a sixth embodiment of the present invention, in which a connection part between a circumferential region of a MEA and a frame is overdrawn. An electrode-membrane-frame assembly 1E according to the sixth embodiment differs from the electrode-membrane-frame assembly 1 according to the first embodiment in that the circumferential region of the first catalyst layer 5B1 is formed on an inner side of a circumferential region of the polymer electrolyte membrane 5A when viewed from the thickness direction of the polymer electrolyte membrane 5A.

According to the first embodiment, as shown in FIG. 4, the first catalyst layer 5B1 and the second catalyst layer 5B2 are provided on all over the main surfaces of the polymer electrolyte membrane 5A. This structure can be implemented such that after the catalyst layers are formed on all over main surfaces of a large-size polymer electrolyte membrane, the polymer electrolyte membrane is cut into a desired size. However, in this case, the first catalyst layer 5B1 and the second catalyst layer 5B2 could cause a short circuit at the time of cutting.

Meanwhile, according to the sixth embodiment, the first catalyst layer 5B1 is not formed on the whole surface of the polymer electrolyte membrane 5A, and the circumferential region of the first catalyst layer 5B1 is arranged on the inner side of the circumferential region of the polymer electrolyte membrane 5A when viewed from the thickness direction of the polymer electrolyte membrane 5A. Thus, the first catalyst layer 5B1 and the second catalyst layer 5B2 can be prevented from causing the short circuit.

In addition, according to the sixth embodiment, the first catalyst layer 5B1 is not formed on the whole surface of the polymer electrolyte membrane 5A, and the circumferential region of the first catalyst layer 5B1 is arranged on the inner side of the circumferential region of the polymer electrolyte membrane 5A when viewed from the thickness direction of the polymer, electrolyte membrane 5A, but the present invention is not limited to this. As another example, in the electrode-membrane-frame assembly 1 according to the first embodiment, the second catalyst layer 5B2 may not be formed on the whole surface of the polymer electrolyte membrane 5A, and the circumferential region of the second catalyst layer 5B2 may be arranged on the inner side of the circumferential region of the polymer electrolyte membrane 5A when viewed from the thickness direction of the polymer electrolyte membrane 5A.

Seventh Embodiment

Figure 15:
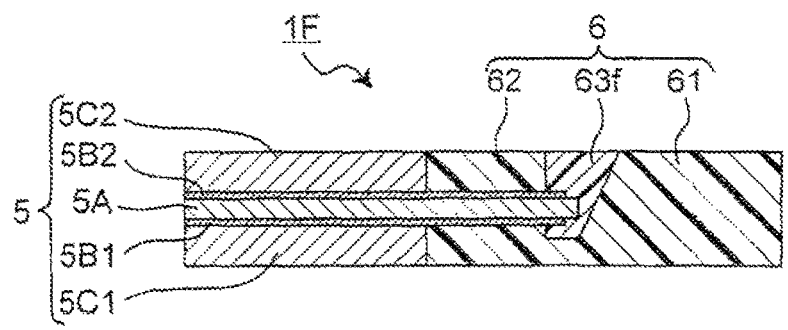
FIG. 15 is a schematic cross-sectional view showing an electrode-membrane-frame assembly according to a seventh embodiment of the present invention, in which a connection part between a circumferential region of a MEA and a frame is overdrawn.

FIG. 15 is a schematic cross-sectional view showing an electrode-membrane-frame assembly according to a seventh embodiment of the present invention, in which a connection part between a circumferential region of a MEA and a frame is overdrawn. An electrode-membrane-frame assembly 1F according to the seventh embodiment differs from the electrode-membrane-frame assembly 1 according to the first embodiment in that the circumferential regions of the first catalyst layer 5B1 and the second catalyst layer 5B2 are formed on the inner side of the circumferential region of the polymer electrolyte membrane 5A when viewed from the thickness direction of the polymer electrolyte membrane 5A. In addition, a third molded body 63f is provided so as to come around to the first catalyst layer 5B1.

According to the seventh embodiment, the short circuit between the first catalyst layer 5B1 and the second catalyst layer 5B2 can be more surely prevented.

Eighth Embodiment

Figure 16:
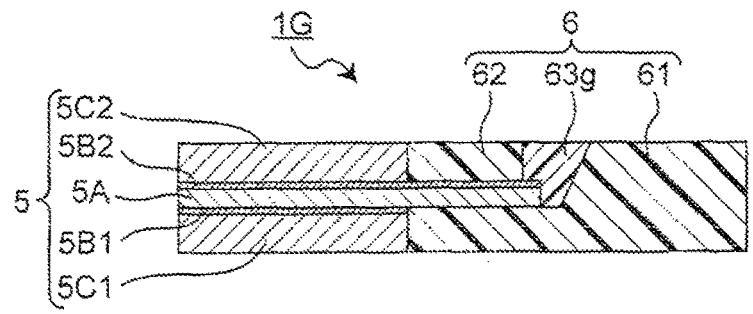
FIG. 16 is a schematic cross-sectional view showing an electrode-membrane-frame assembly according to an eighth embodiment of the present invention, in which a connection part between a circumferential region of a MEA and a frame is overdrawn.

FIG. 16 is a schematic cross-sectional view showing an electrode-membrane-frame assembly according to an eighth embodiment of the present invention, in which a connection part between a circumferential region of a MEA and a frame is overdrawn. An electrode-membrane-frame assembly 1G according to the eighth embodiment differs from the electrode-membrane-frame assembly 1 according to the first embodiment in that the circumferential region of the first catalyst layer 5B1 is formed on the inner side of the circumferential region of the polymer electrolyte membrane 5A, and the circumferential region of the first catalyst layer 5B1 does not overlap with the inner edge part of the first molded body 61 when viewed from the thickness direction of the polymer electrolyte membrane 5A.

According to the eighth embodiment, the short circuit between the first catalyst layer 5B1 and the second catalyst layer 5B2 can be more surely prevented. In addition, since the circumferential region of the first catalyst layer 5B1 does not overlap with the inner edge part of the first molded body 61, an amount of the first catalyst layer 5B1 which does not effectively contribute to the power generation can be reduced.

Ninth Embodiment

Figure 17:
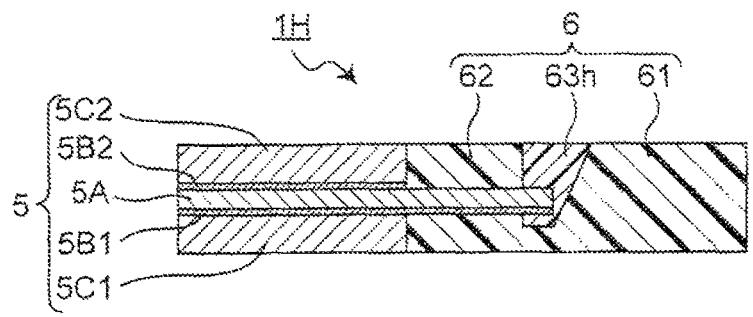
FIG. 17 is a schematic cross-sectional view showing an electrode-membrane-frame assembly according to a ninth embodiment of the present invention, in which a connection part between a circumferential region of a MEA and a frame is overdrawn.

FIG. 17 is a schematic cross-sectional view showing an electrode-membrane-frame assembly according to a ninth embodiment of the present invention, in which a connection part between a circumferential region of a MEA and a frame is overdrawn. An electrode-membrane-frame assembly 1H according to the ninth embodiment differs from the electrode-membrane-frame assembly 1 according to the first embodiment in that the circumferential region of the second catalyst layer 5B2 is arranged on the inner side of the circumferential region of the polymer electrolyte membrane 5A, and the circumferential region of the second catalyst layer 5B2 is formed so as not to overlap with the inner edge part of the second molded body 62 when viewed from the thickness direction of the polymer electrolyte membrane 5A. In addition, the main surface of the circumferential region of the first catalyst layer 5B1 is formed so as to be partially exposed, and a third molded body 63h is formed so as to come around to the first catalyst layer 5B1.

According to the ninth embodiment, the short circuit between the first catalyst layer 5B1 and the second catalyst layer 5B2 can be more surely prevented. In addition, since the circumferential region of the first catalyst layer 5B2 does not overlap with the inner edge part of the second molded body 62, an amount of the second catalyst layer 5B2 which does not effectively contribute to the power generation can be reduced.

Tenth Embodiment

Figure 18:
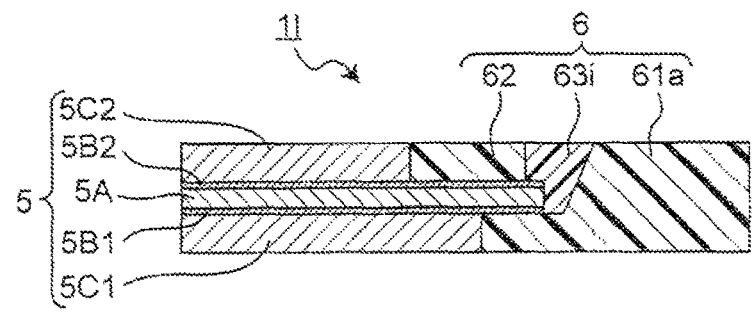
FIG. 18 is a schematic cross-sectional view showing an electrode-membrane-frame assembly according to a tenth embodiment of the present invention, in which a connection part between a circumferential region of a MEA and a frame is overdrawn.

FIG. 18 is a schematic cross-sectional view showing an electrode-membrane-frame assembly according to a tenth embodiment of the present invention, in which a connection part between a circumferential region of a MEA and a frame is overdrawn. An electrode-membrane-frame assembly 1I according to the tenth embodiment differs from the electrode-membrane-frame assembly 1 according to the first embodiment in that the circumferential region of the first gas diffusion layer 5C1 is arranged on the outer side of the circumferential region of the second gas diffusion layer 5C2, and the circumferential region of the first gas diffusion layer 5C1 is arranged so as to overlap with the inner edge part of the second molded body 62 when viewed from the thickness direction of the polymer electrolyte membrane 5A.

According to the tenth embodiment, the same effect as that of the first embodiment can be obtained. In addition, according to the tenth embodiment, since the circumferential region of the first gas diffusion layer 5C1 is arranged so as to overlap with the inner edge part of the second molded body 62 when viewed from the thickness direction of the polymer electrolyte membrane 5A, a handling ability (to prevent breaking, to prevent deformation, or the like) of the electrode-membrane-frame assembly 1I can be improved.

In addition, in the case where the member having the thick part and the thin part like the first molded body 61 is formed by injection molding, when the thin part is long, a degree of difficulty increases in a production process. Therefore, as shown in FIG. 18, it is preferable that a length of a thin part of a first molded body 61a in the surface direction is shorter than that of the first molded body 61 in the first embodiment.

Eleventh Embodiment

Figure 19:
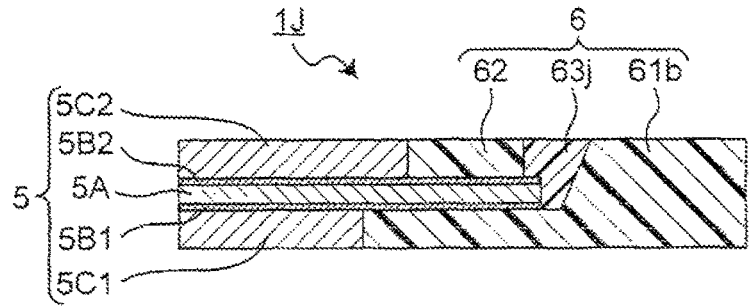
FIG. 19 is a schematic cross-sectional view showing an electrode-membrane-frame assembly according to an eleventh embodiment of the present invention, in which a connection part between a circumferential region of a MEA and a frame is overdrawn.

FIG. 19 is a schematic cross-sectional view showing an electrode-membrane-frame assembly according to an eleventh embodiment of the present invention, in which a connection part between a circumferential region of a MEA and a frame is overdrawn. An electrode-membrane-frame assembly 1J according to the eleventh embodiment differs from the electrode-membrane-frame assembly 1 according to the first embodiment in that the circumferential region of the second gas diffusion layer 5C2 is arranged on the outer side of the circumferential region of the first gas diffusion layer 5C1, and the circumferential region of the second gas diffusion layer 5C2 is arranged so as to overlap with an inner edge part of a first molded body 61b when viewed from the thickness direction of the polymer electrolyte membrane 5A.

According to the eleventh embodiment, the same effect as that of the first embodiment can be obtained. In addition, according to the eleventh embodiment, since the circumferential region of the second gas diffusion layer 5C2 is arranged so as to overlap with the inner edge part of the first molded body 61b when viewed from the thickness direction of the polymer electrolyte membrane 5A, a handling ability (to prevent breaking, to prevent deformation, or the like) of the electrode-membrane-frame assembly 1J can be improved.

Twelfth Embodiment

Figure 20:
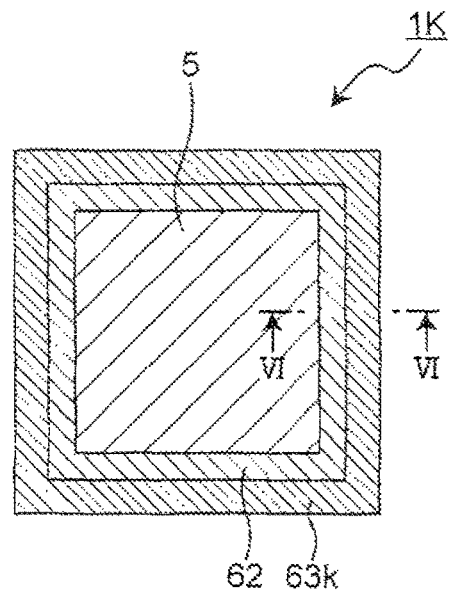
FIG. 20 is a plan view schematically showing a configuration of an electrode-membrane-frame assembly according to a twelfth embodiment of the present invention.
Figure 21:
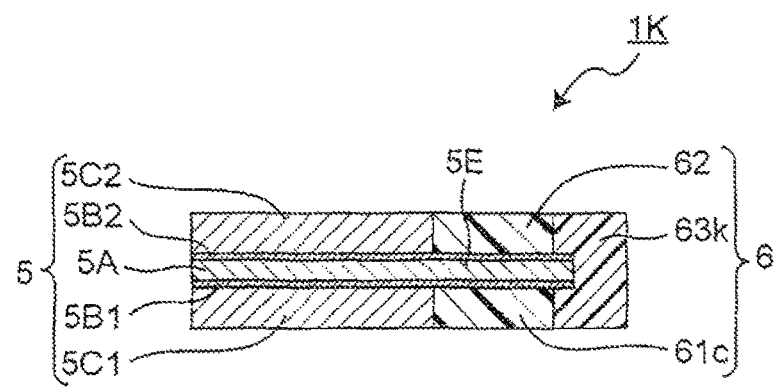
FIG. 21 is a cross-sectional view taken along a line VI-VI in FIG. 20.

FIG. 20 is a plan view schematically showing a configuration of an electrode-membrane-frame assembly according to a twelfth embodiment of the present invention. FIG. 21 is a cross-sectional view taken along a line VI-VI in FIG. 20. An electrode-membrane-frame assembly 1K according to the twelfth embodiment differs from the electrode-membrane-frame assembly 1 according to the first embodiment in that a first molded body 61c is formed so as to have the same size as that of the second molded body 62, and a third molded body 63k is formed so as to connect the first molded body 61c and the second molded body 62.

According to the twelfth embodiment, since the first molded body 61c is formed so as to have the same size of that of the second molded body 62, they can be produced using one kind of die, so that production cost can be reduced.

Figure 22A:
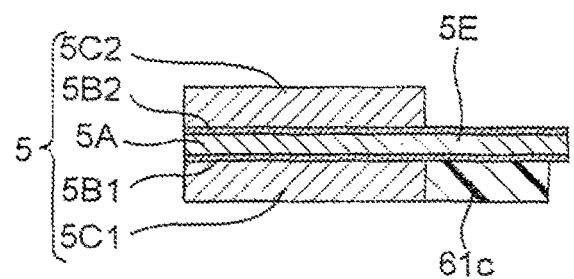
FIG. 22A is a schematic cross-sectional view showing a step of producing the electrode-membrane-frame assembly according to the twelfth embodiment, in which a connection part between a circumferential region of a MEA and a frame is overdrawn.
Figure 22B:
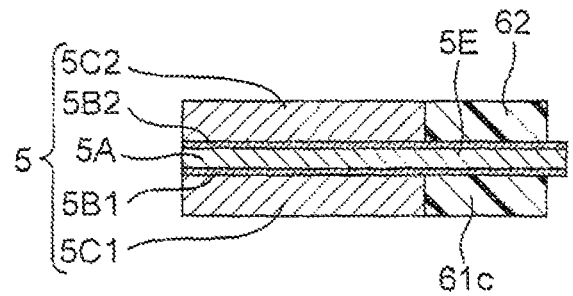
FIG. 22B is a schematic cross-sectional view showing a step after FIG. 22A.
Figure 22C:
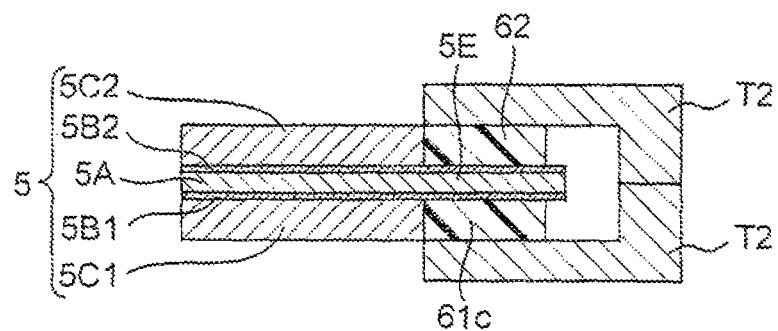
FIG. 22C is a schematic cross-sectional view showing a step after FIG. 22B.

The electrode-membrane-frame assembly 1K according to the twelfth embodiment can be produced as follows. FIGS. 22A to 22C are schematic cross-sectional views showing steps of producing the electrode-membrane-frame assembly 1K, which a connection part between the circumferential region 5E of the MEA 5 and the frame 6 is overdrawn. Here, it is assumed that the first molded body 61c and the second molded body 62 have been previously formed by injection molding and the MEA 5 has been previously produced.

First, as shown in FIG. 22A, the first molded body 61c is arranged on the circumferential region of the first catalyst layer 5B1 close to the first gas diffusion layer 5C1 of the MEA 5. At this time, the first molded body 61c is arranged such that the main surface of the circumferential region of the first catalyst layer 5B1 is partially exposed.

Then, as shown in FIG. 22B, the second molded body 62 is arranged on the circumferential region of the second catalyst layer 5B2 close to the second gas diffusion layer 5C2 of the MEA 5. At this time, the second molded body 62 is arranged such that the main surface of the circumferential region of the second catalyst layer 5B2 is partially exposed.

Then, as shown in FIG. 22C, the first molded body 61c and the second molded body 62 are sandwiched by one paired dies T2, around the circumferential region 5E of the MEA 5, and a molten thermoplastic resin is poured into a gap formed in the one paired dies T2, whereby the third molded body 63k is formed by injection molding. At this time, the molten thermoplastic resin is partially mixed with and present in a part of the main surface of the circumferential region of each of the first catalyst layer 5B1 and the second catalyst layer 5B2.

As described above, the electrode-membrane-frame assembly 1K shown in FIG. 21 is produced.

Thirteenth Embodiment

Figure 23:
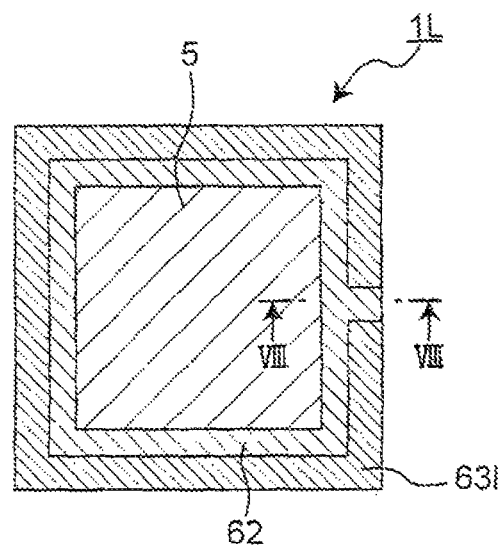
FIG. 23 is a plan view schematically showing a configuration of an electrode-membrane-frame assembly according to a thirteenth embodiment of the present invention.
Figure 24:
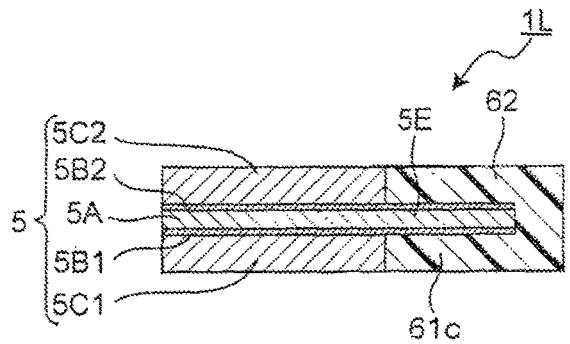
FIG. 24 is a cross-sectional view taken along a line VIII-VIII in FIG. 23.

FIG. 23 is a plan view schematically showing a configuration of an electrode-membrane-frame assembly according to a thirteenth embodiment of the present invention. FIG. 24 is a cross-sectional view taken along a line VIII-VIII in FIG. 23. An electrode-membrane-frame assembly 1L according to the twelfth embodiment differs from the electrode-membrane-frame assembly 1K according to the thirteenth embodiment in that the first molded body 61c and the second molded body 62 are partially connected in an integral manner before a third molded body 63l is formed by injection molding. That is, according to the thirteenth embodiment, the first molded body 61c and the second molded body 62 are integrally molded.

According to the thirteenth embodiment, since the first molded body 61c and the second molded body 62 are integrally molded, the number of production steps can be reduced.

Fourteenth Embodiment

Figure 25:
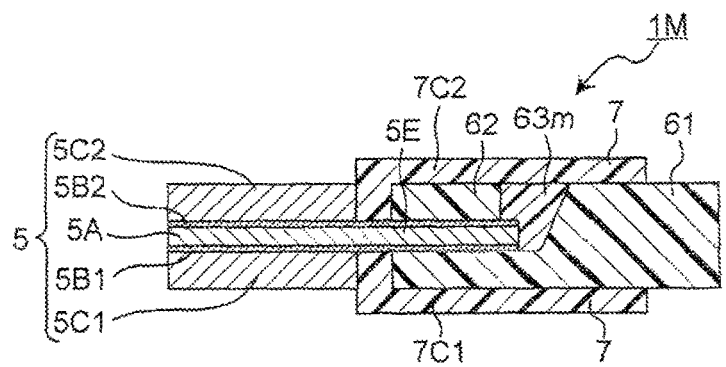
FIG. 25 is a schematic cross-sectional view showing an electrode-membrane-frame assembly according to a fourteenth embodiment of the present invention, in which a connection part between a circumferential region of a MEA and a frame is overdrawn.
Figure 26A:
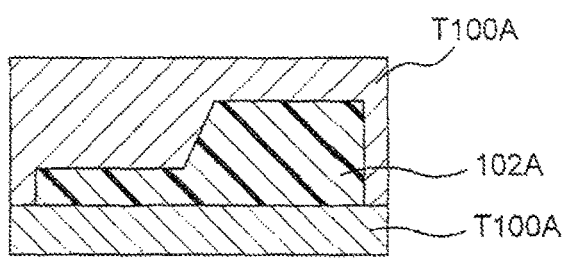
FIG. 26A is a schematic explanatory view showing a step of producing a conventional electrode-membrane-frame assembly, in which a connection part between a circumferential region of a MEA and a frame is overdrawn.
Figure 26B:
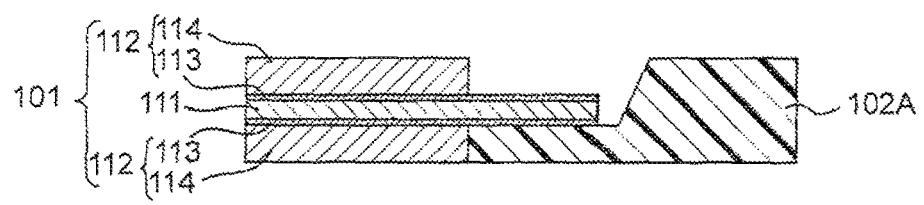
FIG. 26B is a schematic cross-sectional view showing a step after FIG. 26A.
Figure 26C:
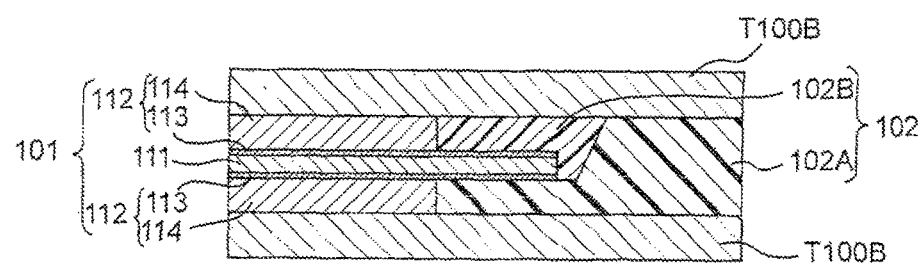
FIG. 26C is a schematic cross-sectional view showing a step after FIG. 26B.

FIG. 25 is a schematic cross-sectional view showing an electrode-membrane-frame assembly according to a fourteenth embodiment of the present invention, in which a connection part between a circumferential region of a MEA and a frame is overdrawn. An electrode-membrane-frame assembly 1M according to the fourteenth embodiment differs from the electrode-membrane-frame assembly 1 according to the first embodiment in that a gap is provided between the frame 6, and the first and second gas diffusion layers 5C1 and 5C2, and the gap is filled with extension parts 7C1 and 7C2 extending from the gaskets 7 and 7 and serving as the elastic body. According to the fourteenth embodiment, the whole gasket 7 having the extension parts 7C1 and 7C2 is formed in the vicinity of the power generation region so that a high-temperature and high-pressure thermoplastic resin is not to be directly in contact with the polymer electrolyte membrane 5A. For example, the gasket 7 is constituted by an elastic body which has been previously formed by injection molding.

In the case where, the cell 10 is configured by the electrode-membrane-frame assembly 1 according to the first embodiment, as shown in FIG. 2, a gap 40 is formed between a neighborhood of the connection part of the frame 6 and the MEA 5 of the electrode-membrane-frame assembly 1, and each of the anode separator 2 and the cathode separator 3. Since the fuel gas and the oxidant gas electrically react mostly between the opposed first and second electrode layers 5D1 and 5D2, there is a possibility that the gap 40 becomes a passage for a short cut and the fuel gas and the oxidant gas are not sufficiently supplied to the first and second electrode layers 5D1 and 5D2.

Therefore, according to the fourteenth embodiment, the extension parts 7C1 and 7C2 extend from the gasket 7 so as to fill the gap 40. Thus, the fuel gas and the oxidant gas can be sufficiently supplied to the first and second electrode layers 5D1 and 5D2.

Fifteenth Embodiment

Figure 27:
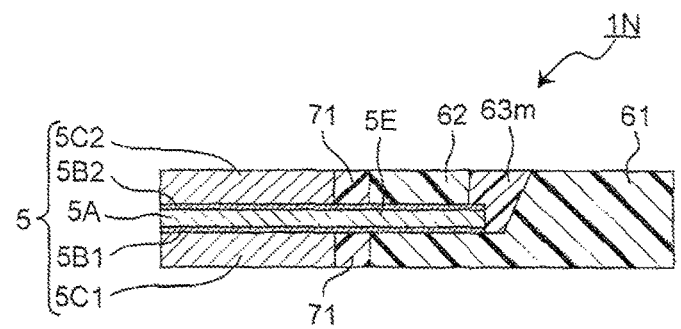
FIG. 27 is a schematic cross-sectional view showing an electrode-membrane-frame assembly according to a fifteenth embodiment of the present invention, in which a connection part between a circumferential region of a MEA and a frame is overdrawn.

FIG. 27 is a schematic cross-sectional view showing an electrode-membrane-frame assembly according to a fifteenth embodiment of the present invention, in which a connection part between a circumferential region of a MEA and a frame is overdrawn. An electrode-membrane-frame assembly 1N according to the fifteenth embodiment differs from the electrode-membrane-frame assembly 1M according to the fourteenth embodiment in that the gap 40 is filled with an elastic body 71 instead of the case where the gap 40 is filled with the extension parts 7C1 and 7C2.

The elastic body 71 is formed in the vicinity of the power generation region so that the high-temperature and high-pressure thermoplastic resin is not to be directly in contact with the polymer electrolyte membrane 5A. For example, the elastic body 71 has been previously formed by injection molding before it is arranged between the first gas diffusion layer 5C1 and the first molded body 61, and between the second gas diffusion layer 5C2 and the second molded body 62. Thus, the same effect in which the fuel gas and the oxidant gas can be sufficiently supplied to the first and second electrode layers 5D1 and 5D2 can be obtained similar to the fourteenth embodiment.

Sixteenth Embodiment

Figure 28:
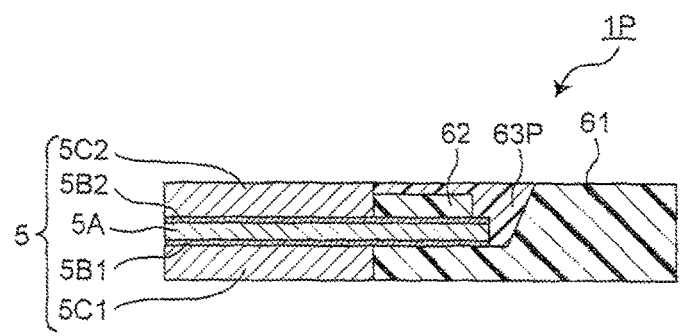
FIG. 28 is a schematic cross-sectional view showing an electrode-membrane-frame assembly according to a sixteenth embodiment of the present invention, in which a connection part between a circumferential region of a MEA and a frame is overdrawn.

FIG. 28 is a schematic cross-sectional view showing an electrode-membrane-frame assembly according to a sixteenth embodiment of the present invention, in which a connection part between a circumferential region of a MEA and a frame is overdrawn. An electrode-membrane-frame assembly 1P according to the sixteenth embodiment differs from the electrode-membrane-frame assembly 1 according to the first embodiment in that a resin material constituting a third molded body 63p partially covers a whole or one part of the second molded body 62. In this configuration also, the same effect as that of the first embodiment can be obtained.

In addition, in the case where the injection molding is performed such that the resin material constituting the third molded body 63p is partially mixed with and present in the second gas diffusion layer 5C2, the second gas diffusion layer 5C2 and the third molded body 63p can be strongly fixed. In addition, even when there is a gap between the second gas diffusion layer 5C2 and the second molded body 62, a defect such as a short cut can be prevented due to the third molded body 63p. Furthermore, since the high-temperature and high-pressure thermoplastic resin is not directly in contact with the polymer electrolyte membrane 5A in the vicinity of the power generation region, the polymer electrolyte membrane 5A can be prevented from deteriorating, and power generation performance can be prevented from being lowered.

In addition, it is to be noted that, any appropriate combination of the various embodiments or examples described above can achieve their respective effects.

INDUSTRIAL APPLICABILITY

According to the electrode-membrane-frame assembly and the method for producing the same of the present invention, the polymer electrolyte membrane can be prevented from deteriorating, so that the present invention is useful for a fuel cell used as a drive source for a moving vehicle such as a car, a distributed power generation system, a household cogeneration system, or the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A method for producing an electrode-membrane-frame assembly in which a frame is formed on a circumferential region of a membrane-electrode assembly, the membrane-electrode assembly having a first catalyst layer arranged on a first main surface of a polymer electrolyte membrane, a first gas diffusion layer arranged on a main surface of the first catalyst layer, a second catalyst layer arranged on a second main surface of the polymer electrolyte membrane, and a second gas diffusion layer arranged on a main surface of the second catalyst layer, the method comprising:

arranging a first molded body made of resin on a side of the first main surface of the polymer electrolyte membrane so that, with respect to a cross-section taken along a thickness direction of the polymer electrolyte membrane, a circumferential region of the polymer electrolyte membrane overlaps with at least an inner edge part of the first molded body, the first molded body is in contact with the first gas diffusion layer, the first molded body being molded before arranging the first molded body on the side of the first main surface of the polymer electrolyte membrane;

arranging a second molded body made of resin on a side of the second main surface of the polymer electrolyte membrane so that, with respect to the cross-section taken along the thickness direction, the circumferential region of the polymer electrolyte membrane overlaps with at least an inner edge part of the second molded body, the second molded body is in contact with the second gas diffusion layer and is not in physical contact with the first molded body, the second molded body being molded before arranging the second molded body on the side of the second main surface of the polymer electrolyte membrane; and after the arranging of the first molded body and the arranging of the second molded body, forming a third molded body made of resin between the first molded body and an outer edge part of the second molded body by injection molding so as to integrally connect the first molded body, the second molded body, and the polymer electrolyte membrane, and such that, with respect to the cross-section taken along the thickness direction, no portion of the third molded body is directly in contact with an inner side region of the second main surface of the polymer electrolyte membrane positioned on an inner side of the outer edge part of the second molded body, so as to form the frame including the first molded body, the second molded body and the third molded body, such that a second part of the third molded body is in physical contact with the outer edge part of the second molded body, and a first part of the third molded body, opposite the second part of the third molded body, is in physical contact with the first molded body, and the third molded body is sandwiched between the first molded body and the outer edge part of the second molded body.

2. The method for producing an electrode-membrane-frame assembly according to claim 1, wherein in the arranging of the second molded body, the second molded body is arranged on a circumferential region of the second catalyst layer so that a main surface of the circumferential region of the second catalyst layer is partially exposed, and in the forming of the third molded body, the third molded body is formed by injection molding so that, with respect to the cross-section taken along the thickness direction, the third molded body partially overlaps with a part of the exposed circumferential region of the second catalyst layer when viewed from the thickness direction of the polymer electrolyte membrane.

3. The method for producing an electrode-membrane-frame assembly according to claim 2, wherein
in the forming of the third molded body, the third molded body is formed by injection molding so that a resin material constituting the third molded body is partially mixed with and present in the part of the exposed circumferential region of the second catalyst layer.

4. The method for producing an electrode-membrane-frame assembly according to claim 2, wherein
in the arranging of the first molded body, the first molded body is arranged on a circumferential region of the first catalyst layer so that a main surface of the circumferential region of the first catalyst layer is partially exposed, and
in the forming of the third molded body, the third molded body is formed by injection molding so that, with respect to the cross-section taken along the thickness direction, the third molded body partially overlaps with a part of the exposed circumferential region of the first catalyst layer.

5. The method for producing an electrode-membrane-frame assembly according to claim 4, wherein
in the forming of the third molded body, the third molded body is formed by injection molding so that a resin material constituting the third molded body is partially mixed with and present in the part of the exposed circumferential region of the first catalyst layer.

6. The method for producing an electrode-membrane-frame assembly according to claim 1, wherein
the membrane-electrode assembly is provided so that, with respect to the cross-section taken along the thickness direction, at least one of a circumferential region of the first catalyst layer and a circumferential region of the second catalyst layer is arranged on an inner side of the circumferential region of the polymer electrolyte membrane.

7. The method for producing an electrode-membrane-frame assembly according to claim 1, wherein
the membrane-electrode assembly is provided so that, with respect to the cross-section taken along the thickness direction, a circumferential region of the first catalyst layer is arranged on an outer side of a circumferential region of the first gas diffusion layer, and a circumferential region of the second catalyst layer is arranged on an outer side of a circumferential region of the second gas diffusion layer,
in the arranging of the first molded body, the first molded body is arranged so that, with respect to the cross-section taken along the thickness direction, the circumferential region of the first catalyst layer overlaps with at least the inner edge part of the first molded body, and
in the arranging of the second molded body, the second molded body is arranged so that, with respect to the cross-section taken along the thickness direction, the circumferential region of the second catalyst layer overlaps with at least the inner edge part of the second molded body.

8. The method for producing an electrode-membrane-frame assembly according to claim 1, further comprising:
arranging the first gas diffusion layer on the main surface of the first catalyst layer; and
arranging the second gas diffusion layer on the main surface of the second catalyst layer, wherein
the arranging of the first gas diffusion layer and the arranging of the second gas diffusion layer are performed before the arranging of the first molded body, the arranging of the second molded body, and the forming of the third molded body,
in the arranging of the first molded body, and with respect to the cross-section taken along the thickness direction, the first molded body is arranged on an outer side of a circumferential region of the first gas diffusion layer, and
in the arranging of the second molded body, and with respect to the cross-section taken along the thickness direction, the second molded body is arranged on an outer side of a circumferential region of the second gas diffusion layer.

9. The method for producing an electrode-membrane-frame assembly according to claim 1, further comprising:
arranging the first gas diffusion layer on the main surface of the first catalyst layer; and
arranging the second gas diffusion layer on the main surface of the second catalyst layer, wherein
the arranging of the first gas diffusion layer and the arranging of the second gas diffusion layer are performed after the arranging of the first molded body, the arranging of the second molded body, and the forming of the third molded body,
in the arranging of the first molded body, and with respect to the cross-section taken along the thickness direction, the first gas diffusion layer is arranged on an inner side of the inner edge part of the first molded body, and
in the arranging of the second molded body, and with respect to the cross-section taken along the thickness direction, the second gas diffusion layer is arranged on an inner side of the inner edge part of the second molded body.

10. The method for producing an electrode-membrane-frame assembly according to claim 8, wherein
in the forming of the third molded body, the third molded body is formed by injection molding so that a resin material constituting the third molded body is partially mixed with and present in the circumferential region of the second gas diffusion layer.

11. The method for producing an electrode-membrane-frame assembly according to claim 1, wherein the forming of the third molded body includes arranging a pair of dies such that the first molded body and the second molded body are sandwiched between the dies in the thickness direction, and injecting molten resin into a gap formed between the first molded body and the second molded body within the dies.

12. The method for producing the electrode-membrane-frame assembly according to claim 1, wherein
the third molded body is not in contact with the main surface of the second catalyst layer.

13. The method for producing the electrode-membrane-frame assembly according to claim 1, wherein
the third molded body is located further from a power generation region of the electrode-membrane-frame assembly with respect to the second molded body.

* * * * *